United States Patent
Li et al.

(10) Patent No.: US 11,412,516 B2
(45) Date of Patent: Aug. 9, 2022

(54) DATA TRANSMISSION METHOD AND APPARATUS

(71) Applicant: Huawei Technologies Co., Ltd., Shenzhen (CN)

(72) Inventors: Yunbo Li, Shenzhen (CN); Ming Gan, Shenzhen (CN); Tao Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 16/791,726

(22) Filed: Feb. 14, 2020

(65) Prior Publication Data

US 2020/0187186 A1    Jun. 11, 2020

Related U.S. Application Data

(63) Continuation of application No. PCT/CN2018/092346, filed on Jun. 22, 2018.

(30) Foreign Application Priority Data

Aug. 17, 2017    (CN) .......................... 201710708312.1

(51) Int. Cl.
*H04W 56/00*    (2009.01)
*H04W 72/04*    (2009.01)
(Continued)

(52) U.S. Cl.
CPC ......... *H04W 72/046* (2013.01); *H04L 1/0003* (2013.01); *H04W 72/0446* (2013.01); *H04W 76/11* (2018.02); *H04W 80/02* (2013.01)

(58) Field of Classification Search
CPC ............... H04W 72/046; H04W 76/11; H04W 72/0446; H04W 80/02; H04L 1/003
(Continued)

(56) References Cited

U.S. PATENT DOCUMENTS

| 2011/0051636 A1 | 3/2011 | Van Nee et al. |
| 2012/0113806 A1 | 5/2012 | Gong et al. |

(Continued)

FOREIGN PATENT DOCUMENTS

| CN | 102484554 A | 5/2012 |
| CN | 103002504 A | 3/2013 |

(Continued)

OTHER PUBLICATIONS

"Part 11: Wireless LAN Medium Access Control (MAC) and Physical Layer (PHY) Specifications, Amendment 6: Enhancements for High Efficiency WLAN," IEEE P802.11ax/D1.3, Jun. 2017, 522 pages.

*Primary Examiner* — Sai Ming Chan
(74) *Attorney, Agent, or Firm* — Conley Rose, P.C.

(57) ABSTRACT

A data transmission method and apparatus applied to the wireless communications field, where the method includes receiving, by a first access point (AP), cooperation configuration information from a second AP, where the cooperation configuration information of the second AP indicates basic cooperation information of the second AP to the first AP, and triggering, by the first AP based on a quantity of spatial streams allocated through cooperation, at least one cooperation station (STA) associated with the first AP to perform uplink data transmission using a quantity of spatial streams allocated by the first AP.

20 Claims, 19 Drawing Sheets

(51) Int. Cl.
*H04W 76/11* (2018.01)
*H04L 1/00* (2006.01)
*H04W 80/02* (2009.01)

(58) Field of Classification Search
USPC .......................................................... 370/329
See application file for complete search history.

(56) References Cited

U.S. PATENT DOCUMENTS

| | | | |
|---|---|---|---|
| 2014/0003360 A1* | 1/2014 | Novak | H04W 16/14 |
| | | | 370/329 |
| 2015/0156794 A1 | 6/2015 | Kwon et al. | |
| 2015/0327291 A1 | 11/2015 | Zhou et al. | |
| 2016/0081003 A1* | 3/2016 | Ishihara | H04B 7/155 |
| | | | 370/338 |
| 2017/0077999 A1* | 3/2017 | Asterjadhi | H04W 72/0413 |
| 2017/0188244 A1 | 6/2017 | Aboul-Magd et al. | |
| 2018/0262936 A1* | 9/2018 | Zhou | H04J 11/0053 |
| 2018/0288800 A1 | 10/2018 | Yu et al. | |

FOREIGN PATENT DOCUMENTS

| | | |
|---|---|---|
| CN | 103181213 A | 6/2013 |
| CN | 104066091 A | 9/2014 |
| CN | 105594245 A | 5/2016 |
| CN | 105850212 A | 8/2016 |
| CN | 106464335 A | 2/2017 |
| CN | 106851848 A | 6/2017 |
| EP | 3125635 A1 | 2/2017 |
| WO | 2013165582 A1 | 11/2013 |
| WO | 2015180047 A1 | 12/2015 |
| WO | 2016201132 A1 | 12/2016 |

\* cited by examiner

| Frame control | Duration | Receive end address (RA) | Transmit end address (TA) | Transmission time length (PPDU Length) | Quantity of cooperation STAs (Number of Cooperate STAs) | Cooperation STA ID list (STA ID list) | List of spatial steams of cooperation STAs (SS Allocation list) | Padding | Frame check sequence (FCS) |

FIG. 4

| Frame control | Duration | Receive end address (RA) | Transmit end address (TA) | Common information field (Common Info) | User information field (User Info) | ... | User information field (User Info) | Padding | Frame check sequence (FCS) |

FIG. 7

DATA TRANSMISSION METHOD AND APPARATUS

CROSS-REFERENCE TO RELATED APPLICATIONS

This application is a continuation of International Patent Application No. PCT/CN2018/092346 filed on Jun. 22, 2018, which claims priority to Chinese Patent Application No. 201710708312.1 filed on Aug. 17, 2017. The disclosures of the aforementioned applications are incorporated herein by reference in their entireties.

TECHNICAL FIELD

The present application relates to the field of wireless communications technologies, and especially, to a data transmission method and apparatus.

BACKGROUND

In a Wi-Fi technology, a system including one access point (AP) and one or more associated stations (STAs) is generally referred to as a basic service set (BSS). The AP is connected to the Internet, and the one or more associated STA accesses a network through the AP.

With development of the Wi-Fi technology, on the basis that an initial protocol supports only single-user sending, an uplink multi-user (MU) multiple-input and multiple-output (MIMO) technology is introduced into the Institute of Electrical and Electronics Engineers (IEEE) 802.11ax protocol. Therefore, after an AP obtains a channel through contention, the AP may schedule a plurality of STAs in one BSS by sending a trigger frame such that the plurality of STAs simultaneously send, uplink data to the AP associated with the plurality of STAs using MIMO. However, in this scenario, the plurality of STAs all need to be associated with the AP. That is, a plurality of users send data in parallel only in one BSS, and only to an AP associated with the plurality users.

However, as Wi-Fi deployment density increases, Wi-Fi coverage also gradually increases from single-point coverage to area coverage. When one area is covered by a plurality of BSSs, bidirectional cross interference exists between adjacent BSSs. Consequently, it is relatively difficult for a plurality of users to transmit data in parallel in different BSSs. However, in two adjacent BSSs, two APs cooperate with each other. This can implement beneficial effects, for example, can improve system efficiency and reduce interference.

In other approaches, to implement parallel data transmission, cooperation is performed between two adjacent BSSs in a beamforming cooperation manner. In this manner, two adjacent APs need to pre-obtain state information of a channel between each of the two APs and a target STA and state information of a channel between each of the two APs and a cooperation STA, and the channel state information has a time validity period, for example, dozens of milliseconds. After the time validity period, a channel needs to be re-obtained, and consequently overheads of obtaining channel information are relatively large.

SUMMARY

To resolve a problem of a related technology, the present application provides a data transmission method and apparatus, and an objective of the present application is implemented using the following technical solutions.

According to a first aspect, a data transmission method is provided and is applied to an AP. The method includes: receiving, by a first AP, cooperation configuration information sent by a second AP, where the cooperation configuration information of the second AP is used to indicate basic cooperation information of the second AP to the first AP, and triggering, by the first AP, at least one cooperation STA associated with the first AP to perform uplink transmission using a quantity of spatial streams allocated by the first AP, where a sum of the quantity of spatial streams allocated by the first AP to the at least one cooperation STA associated with the first AP and a quantity of spatial streams allocated by the second AP to at least one cooperation STA associated with the second AP does not exceed a smaller value of an upper limit of a quantity of received spatial streams of the first AP and an upper limit of a quantity of received spatial streams of the second AP, or transmitting, by a first AP, downlink data to at least one cooperation STA associated with the first AP using a quantity of spatial streams allocated by the first AP, where a sum of the quantity of spatial streams allocated by the first AP to the at least one cooperation STA associated with the first AP and a quantity of spatial streams allocated by the second AP to at least one cooperation STA associated with the second AP does not exceed a smallest value of upper limits of quantities of received spatial streams of all cooperation STAs associated with the first AP and the second AP, where the basic cooperation information of the second AP includes at least an identifier (AID) of the at least one cooperation STA associated with the second AP, and the quantity of spatial streams allocated by the second AP to the at least one cooperation STA associated with the second AP.

According to a second aspect, a data transmission method is provided and is applied to a STA. The method includes performing, by a cooperation STA associated with a first AP based on a quantity of spatial streams allocated by the first AP, uplink data transmission in parallel with at least one cooperation STA associated with a second AP, where a sum of the quantity of spatial streams allocated by the first AP to at least one cooperation STA associated with the first AP and a quantity of spatial streams allocated by the second AP to the at least one cooperation STA associated with the second AP does not exceed a smaller value of an upper limit of a quantity of received spatial streams of the first AP and an upper limit of a quantity of received spatial streams of the second AP, or receiving, by a cooperation STA associated with a first AP based on a quantity of spatial streams allocated by the first AP, downlink data sent by the first AP, where a sum of the quantity of spatial streams allocated by the first AP to at least one cooperation STA associated with the first AP and a quantity of spatial streams allocated by a second AP to at least one cooperation STA associated with the second AP does not exceed a smallest value of upper limits of quantities of received spatial streams of all cooperation STAs associated with the first AP and the second AP.

With reference to the second aspect, in a first possible implementation of the second aspect, performing, by a cooperation STA associated with a first AP based on a quantity of spatial streams allocated by the first AP, uplink data transmission in parallel with at least one cooperation STA associated with a second AP includes receiving, by the cooperation STA associated with the first AP, a first trigger frame sent by the first AP, where the first trigger frame is used to trigger the at least one cooperation STA associated with the first AP to perform uplink data transmission using a specified quantity of spatial streams and a transmission time length after a specified delay, and after waiting to receive a second trigger frame sent by the second AP, performing, by the cooperation STA associated with the first AP based on a delay upload indication of the first trigger frame, uplink data transmission in parallel with the at least one cooperation STA associated with the second AP, and there is a short interframe space (SIFS) time between the first trigger frame sent by the first AP and a second trigger frame sent by the second AP, the second trigger frame is used to trigger the at least one cooperation STA associated with the second AP to perform uplink data transmission using a specified quantity of spatial streams and a transmission time length, and the transmission time length of the at least one cooperation STA associated with the first AP is the same as that of the at least one cooperation STA associated with the second AP.

According to a third aspect, a data transmission apparatus is provided and is applied to a wireless AP. The apparatus includes a configuration unit configured to receive cooperation configuration information sent by a second AP, where the cooperation configuration information of the second AP is used to indicate basic cooperation information of the second AP to the first AP, a triggering unit configured to trigger at least one cooperation STA associated with the first AP to perform uplink transmission using a quantity of spatial streams allocated by the first AP, where a sum of the quantity of spatial streams allocated by the first AP to the at least one cooperation STA associated with the first AP and a quantity of spatial streams allocated by the second AP to at least one cooperation STA associated with the second AP does not exceed a smaller value of an upper limit of a quantity of received spatial streams of the first AP and an upper limit of a quantity of received spatial streams of the second AP, or a sending unit configured to transmit downlink data to at least one cooperation STA associated with the first AP using a quantity of spatial streams allocated by the first AP, where a sum of the quantity of spatial streams allocated by the first AP to the at least one cooperation STA associated with the first AP and a quantity of spatial streams allocated by the second AP to at least one cooperation STA associated with the second AP does not exceed a smallest value of upper limits of quantities of received spatial streams of all cooperation STAs associated with the first AP and the second AP.

According to a fourth aspect, a data transmission apparatus is provided and is applied to a STA. The apparatus includes a sending unit configured to perform, based on a quantity of spatial streams allocated by a first AP, uplink data transmission in parallel with at least one cooperation STA associated with a second AP, where a sum of the quantity of spatial streams allocated by the first AP to at least one cooperation STA associated with the first AP and a quantity of spatial streams allocated by the second AP to the at least one cooperation STA associated with the second AP does not exceed a smaller value of an upper limit of a quantity of received spatial streams of the first AP and an upper limit of a quantity of received spatial streams of the second AP, or a receiving unit configured to receive, based on a quantity of spatial streams allocated by the first AP, downlink data sent by the first AP, where a sum of the quantity of spatial streams allocated by the first AP to at least one cooperation STA associated with the first AP and a quantity of spatial streams allocated by the second AP to the at least one cooperation STA associated with the second AP does not exceed a smallest value of upper limits of quantities of received spatial streams of all cooperation STAs associated with the first AP and the second AP.

The technical solutions provided in the embodiments of the present application bring the following beneficial effects.

According to the data transmission method provided in the present application, two APs negotiate to allocate a quantity of spatial streams to a cooperation STA associated with the first AP and a cooperation STA associated with the second AP. The two APs may trigger a plurality of cooperation STAs associated with the two APs to perform uplink data transmission in parallel, and the two APs may simultaneously perform downlink data transmission to the plurality of cooperation STAs associated with the two APs. In this embodiment of the present application, MU parallel data transmission associated with one AP is extended to MU parallel data transmission associated with two APs, and a range of MU parallel data transmission is extended. In addition, the two APs collaboratively trigger the plurality of cooperation STAs associated with the two APs to perform uplink data transmission in parallel or the two APs collaboratively send downlink data to the plurality of cooperation STAs associated with the two APs at the same time, without requiring the two APs to separately transmit data to the associated cooperation STAs associated with the first AP and the second AP in a time division manner, thereby improving system transmission efficiency.

Further, when two APs cooperatively trigger, using two APs, the plurality of cooperation STAs associated with two APs to perform uplink data transmission in parallel or when two APs cooperatively simultaneously send downlink data to the plurality of cooperation STAs associated with two APs, uniqueness of AIDs of cooperation STAs associated with different APs is ensured, and a case in which triggering scheduling and data sending are confused is avoided when the AP triggers to schedule a cooperation STA associated with a cooperation AP, or when the AP sends downlink data to a cooperation STA associated with a cooperation AP such that the AP can clearly and accurately transmit data to a corresponding STA, thereby improving cooperative transmission accuracy.

Further, after the AP receives uplink data of each cooperation STA, each AP may return acknowledgement information in parallel to each associated cooperation STA in a high-efficiency (HE) MU physical layer convergence procedure (PLCP) protocol data unit (PPDU) frame format. Alternatively, after the cooperation STA receives downlink data sent by each AP, each cooperation STA may return acknowledgement information to each associated AP in parallel using a frame format of an HE trigger-based (TB) PPDU. This reduces time overheads caused by serially returning the acknowledgement information, and improves efficiency of returning the acknowledgement information.

BRIEF DESCRIPTION OF DRAWINGS

To describe some of the embodiments of the present application more clearly, the following briefly describes some of the accompanying drawings describing the embodiments. A person of ordinary skill in the art may still derive other drawings from these accompanying drawings without creative efforts.

FIG. 4 is a schematic diagram of another frame structure of cooperation configuration information according to an embodiment of the present application;

FIG. 7 is a schematic diagram of a frame structure of cooperation acknowledgement information according to an embodiment of the present application;

DESCRIPTION OF EMBODIMENTS

To enable a person skilled in the art to better understand the technical solutions in the embodiments of the present application, and enable the foregoing objectives, procedures, features, and advantages of the embodiments of the present application to be clearer, the following further describes the technical solutions in the embodiments of the present application with reference to the accompanying drawings in the embodiments of the present application. The described embodiments are some but not all of the embodiments of the present application. All other embodiments obtained by a person of ordinary skill in the art according to the embodiments of the present application without creative efforts shall fall within the protection scope of the present application.

The following further describes the technical solutions and procedures in the embodiments of the present application in detail with reference to the accompanying drawings.

Figure 1:
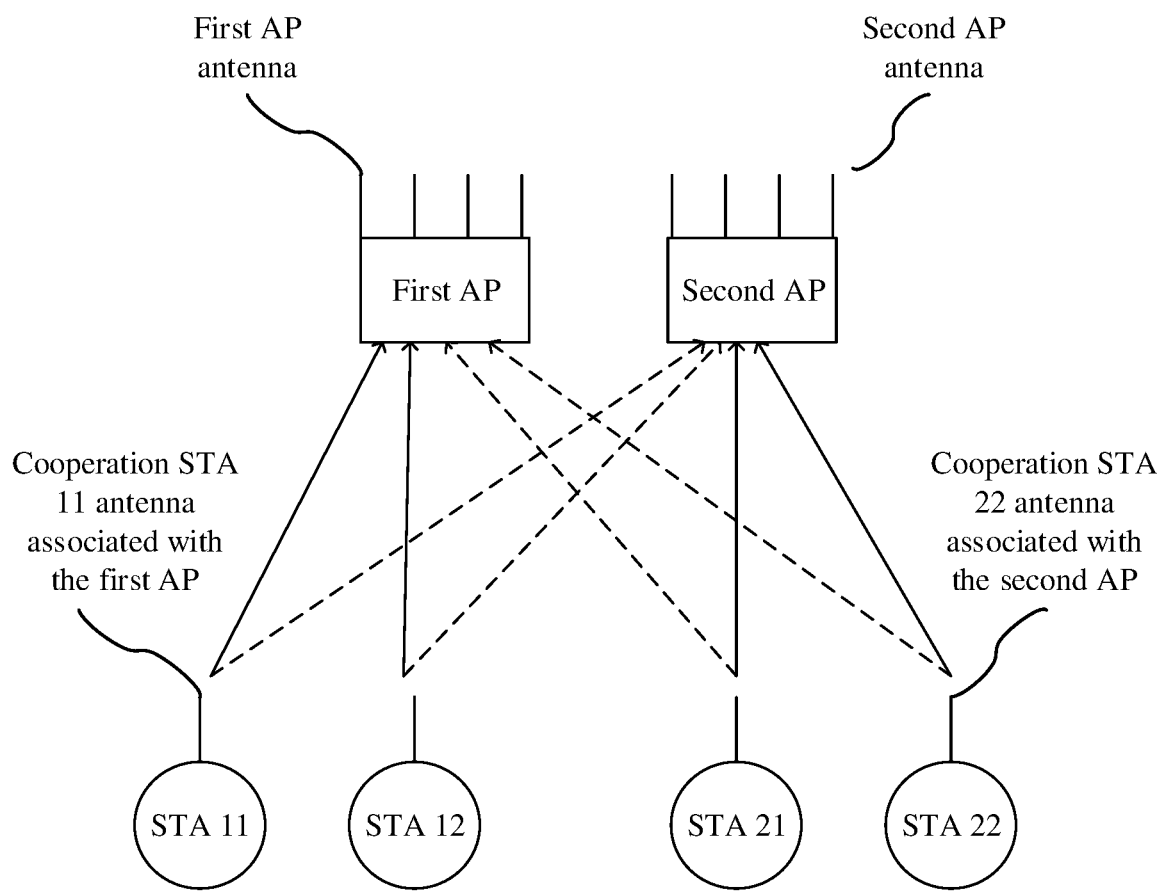
FIG. 1 is a schematic diagram of a network architecture according to an embodiment of the present application.

FIG. 1 shows a specific application scenario of an embodiment of the present application. FIG. 1 includes two APs. Cooperation STAs associated with a first AP are a STA 11 and a STA 12, and cooperation STAs associated with a second AP are a STA 21 and a STA 22. The two APs trigger, by negotiating cooperation configuration information, at least one cooperation STA associated with the two APs to perform uplink data transmission in parallel using a specified quantity of spatial streams. Certainly, in another example, there may be more APs and other cooperation STAs, and this is not shown in FIG. 1.

Embodiment 1

This embodiment provides a data transmission method.

Figure 2:
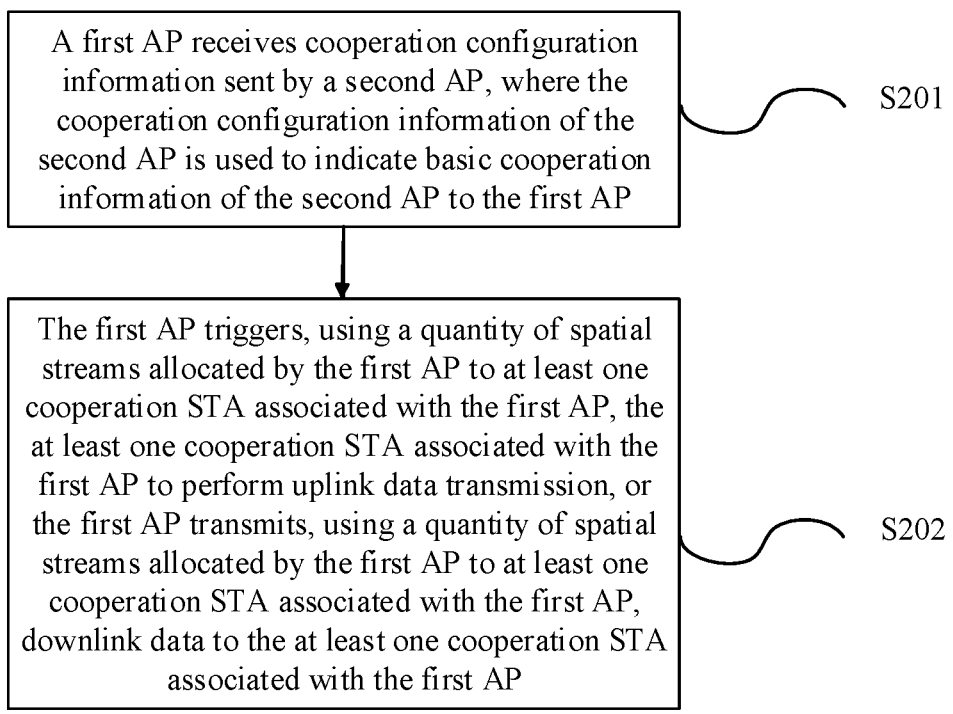
FIG. 2 is a schematic flowchart of a data transmission method according to an embodiment of the present application.

FIG. 2 is a flowchart of a data transmission method according to an embodiment of the present application. The method may include the following steps.

Step S201: A first AP receives cooperation configuration information sent by a second AP, where the cooperation configuration information of the second AP is used to indicate basic cooperation information of the second AP to the first AP.

Further, if the first AP needs to negotiate with the second AP to trigger cooperation STAs to perform uplink data transmission in parallel, before the second AP sends the cooperation configuration information to the first AP, the second AP may allocate, based on a quantity of spatial streams that need to be sent by a cooperation STA associated with the second AP, information such as a quantity of spatial streams, a modulation and coding scheme (MCS), and a transmission time length to the cooperation STA associated with the second AP. If the first AP needs to negotiate with the second AP to transmit downlink data to a STA, before the second AP sends the cooperation configuration information to the first AP, the second AP may determine information such as a quantity of cooperation STAs involved in downlink data transmission, a quantity of spatial streams sent by the second AP in a downlink manner, an MCS, and a transmission time length based on an upper limit of a quantity of received spatial streams of a cooperation STA associated with the second AP and a quantity of spatial streams used by the second AP to perform downlink transmission. After obtaining a channel usage right through channel contention, the second AP adds the foregoing information to the cooperation configuration information, and sends the cooperation configuration information to the first AP. When the first AP and the second AP collaboratively trigger the cooperation STAs to perform uplink data transmission in parallel, the cooperation configuration information herein includes parameters such as a quantity of cooperation STAs associated with the second AP, an AID of the cooperation STA associated with the second AP, a quantity of spatial streams allocated by the second AP to the cooperation STA, the MCS, and the transmission time length. When the first AP and the second AP need to collaboratively perform downlink data transmission, the cooperation configuration information herein includes parameters such as a quantity of cooperation STAs associated with the second AP, an AID of the cooperation STA associated with the second AP, a quantity of spatial streams sent by the second AP to the associated cooperation STA, the MCS, and the transmission time length. A quantity of spatial streams is a quantity of spatial streams that can be transmitted in parallel in a spatial (antenna) dimension, and an upper limit of a quantity of received spatial streams is a maximum quantity of spatial streams that can be received by an AP or a STA.

Figure 3:
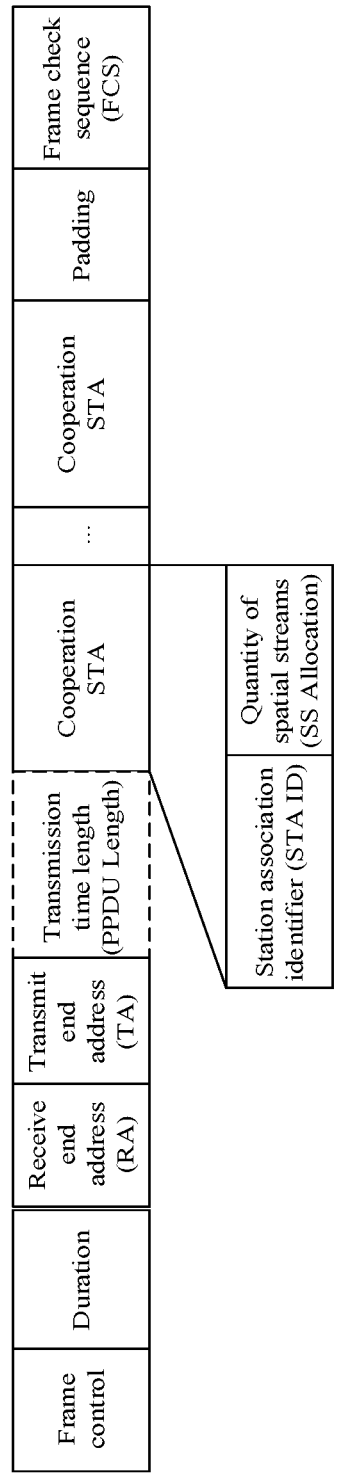
FIG. 3 is a schematic diagram of a frame structure of cooperation configuration information according to an embodiment of the present application.

A frame structure of the cooperation configuration information may be shown in FIG. 3. The cooperation configuration information carries at least necessary information used for cooperation. A receive end address (RA) field is a media access control (MAC) address of a cooperation AP, a transmit end address (TA) field is a MAC address of an AP that sends the cooperation configuration information, a cooperation STA field includes two subfields, a STA identifier (ID) subfield and an SS allocation subfield. The STA ID is an AID of a cooperation STA associated with an AP that sends the cooperation configuration information, and the SS allocation is information about a quantity of spatial streams allocated by the AP that sends the cooperation configuration information and allocated to the cooperation STA associated with the AP. This is shown in a solid line field in FIG. 3. Optionally, in some embodiments, when cooperation APs need to simultaneously or separately trigger cooperation STAs respectively associated with the cooperation APs to perform uplink data transmission in parallel, or when cooperation APs need to simultaneously send, in a downlink manner, downlink data to cooperation STAs respectively associated with the cooperation APs, the frame structure of the cooperation configuration information further needs to include a transmission time length (i.e., PPDU length) field. This is shown in a dashed line field in FIG. 3.

Certainly, the frame structure may also be another structure. For example, as shown in FIG. 4, an RA field is a MAC address of a cooperation AP, a TA field is a MAC address of an AP that sends the cooperation configuration information, a STA ID list field is a list of AIDs of cooperation STAs associated with the AP that sends the cooperation configuration information, and an SS allocation subfield is information about quantities of spatial streams of cooperation STAs corresponding to a sequence in a STA IDs list. The foregoing fields are necessary information for cooperation in the cooperation configuration information, and are shown as solid line parts in FIG. 4. Optionally, in some embodiments, when cooperation APs need to simultaneously or separately trigger cooperation STAs respectively associated with the cooperation APs to perform uplink data transmission in parallel, or when cooperation APs need to simultaneously send, in a downlink manner, downlink data to cooperation STAs respectively associated with the cooperation APs, the frame structure of the cooperation configuration information further needs to include a transmission time length (i.e., PPDU length) field. This is shown in a solid line field in FIG. 4.

Further, in the frame structure of the cooperation configuration information sent by the second AP, the RA field is a MAC address of the first AP, the TA field is a MAC address of the second AP, the STA ID is information about the AID of the cooperation STA associated with the second AP, and the SS allocation is information about the quantity of spatial streams allocated by the second AP to the cooperation STA associated with the second AP.

Step S202: The first AP triggers, using a quantity of spatial streams allocated by the first AP to at least one cooperation STA associated with the first AP, the at least one cooperation STA associated with the first AP to perform uplink data transmission.

Alternatively, the first AP transmits, using a quantity of spatial streams allocated by the first AP to at least one cooperation STA associated with the first AP, downlink data to the at least one cooperation STA associated with the first AP.

Further, when the first AP needs to negotiate with the second AP to trigger cooperation STAs to perform uplink data transmission, after the first AP receives the cooperation configuration information sent by the second AP, under a principle of ensuring that a sum of the quantity of spatial streams allocated by the first AP to the cooperation STA associated with the first AP and the quantity of spatial streams allocated by the second AP to the cooperation STA associated with the second AP does not exceed a smaller value in an upper limit of a quantity of received spatial streams of the first AP and an upper limit of a quantity of received spatial streams of the second AP, based on the AID that is of the cooperation STA associated with the second AP and that is indicated in the cooperation configuration information of the second AP, and the quantity that is of spatial streams allocated by the second AP to the associated cooperation STA and that is indicated in the cooperation configuration information of the second AP, the first AP allocates a quantity of useable spatial streams to the cooperation STA associated with the first AP, or the first AP allocates a quantity of useable spatial streams to the cooperation STA associated with the first AP and the cooperation STA associated with the second AP.

The first AP may send, in a broadcast manner, trigger information to the cooperation STA associated with the first AP in order to trigger the cooperation STA associated with the first AP to perform uplink transmission using the quantity of spatial streams allocated by the first AP and the transmission time length.

Optionally, the first AP may alternatively send, in a broadcast manner, trigger information to the cooperation STA associated with the first AP and the cooperation STA associated with the second AP in order to trigger the cooperation STA associated with the first AP and the cooperation STA associated with the second AP to separately perform uplink transmission using a specified quantity of spatial streams in the trigger information.

Further, when APs need to cooperate with each other to perform downlink data transmission, after the first AP receives the cooperation configuration information sent by the second AP, under a principle of ensuring that a sum of the quantity of spatial streams of the at least one cooperation STA associated with the first AP and the quantity of spatial streams allocated by the second AP to the at least one cooperation STA associated with the second AP does not exceed a smallest value in upper limits of quantities of received spatial streams of all cooperation STAs associated with the first AP and the second AP, based on the quantity of spatial streams that is indicated in the cooperation configuration information of the second AP and that is allocated by the second AP to the cooperation STA associated with the second AP, the first AP allocates a quantity of useable spatial streams to the cooperation STA associated with the first AP, or the first AP allocates a quantity of useable spatial streams to the cooperation STA associated with the first AP and the cooperation STA associated with the second AP.

Embodiment 2 this embodiment provides a method for negotiating the cooperation configuration information between the first AP and the second AP.

Figure 5:
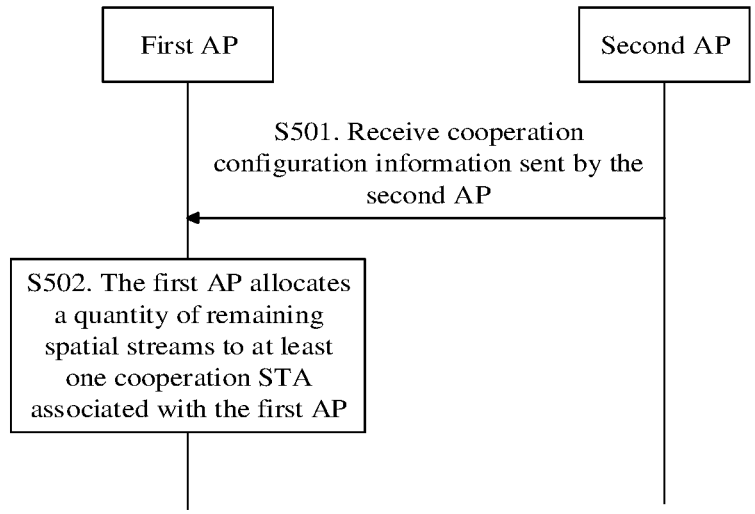
FIG. 5 is a schematic flowchart of a method for negotiating cooperation information according to an embodiment of the present application.

Referring to FIG. 5, the method may include the following steps.

Step S501: The first AP receives cooperation configuration information sent by the second AP, where the cooperation configuration information of the second AP is used to indicate basic cooperation information of the second AP to the first AP.

Step S501 is the same as step S201, and is not described again herein.

Step S502: The first AP allocates a quantity of remaining spatial streams to at least one cooperation STA associated with the first AP.

Further, after the first AP receives the cooperation configuration information sent by the second AP, the first AP preferably considers meeting the quantity of spatial streams allocated by the second AP to the cooperation STA associated with the second AP.

Optionally, if the first AP needs to negotiate with the second AP to trigger the cooperation STA to perform uplink data transmission, and a quantity of spatial streams allocated by the second AP to the cooperation STA associated with the second AP does not exceed an upper limit of a quantity of received spatial streams of the first AP, or when the AP needs to collaboratively perform downlink data transmission, and a quantity of spatial streams allocated by the second AP to the cooperation STA associated with the second AP does not exceed an upper limit of a quantity of received spatial streams of the cooperation STA associated with the first AP, the first AP allocates, based on a quantity of spatial streams that are allocated by the second AP to the cooperation STA associated with the second AP and that are carried in cooperation configuration information of the second AP, the quantity of remaining spatial streams to the cooperation STA associated with the first AP, where the quantity of remaining spatial streams herein is a quantity of remaining spatial streams that may be allocated to the cooperation STA associated with the first AP after the second AP allocates the quantity of spatial streams to the cooperation STA associated with the second AP.

Optionally, if the first AP needs to negotiate with the second AP to trigger the cooperation STA to perform uplink data transmission, and the quantity of spatial streams allocated by the second AP to the cooperation STA associated with the second AP exceeds an upper limit of a quantity of received spatial streams of the first AP, or when the AP needs to collaboratively perform downlink data transmission, and the quantity of spatial streams allocated by the second AP to the cooperation STA associated with the second AP exceeds an upper limit of a quantity of received spatial streams of the cooperation STA associated with the first AP, the first AP sets a quantity of associated cooperation STAs of the first AP that can perform data transmission to zero, and does not allocate a quantity of spatial streams to any cooperation STA associated with the first AP.

Step S503: The first AP does not return cooperation acknowledgement information to the second AP.

After receiving the cooperation configuration information sent by the second AP, the first AP preferably considers meeting a cooperation requirement and the cooperation configuration information of the second AP. Therefore, in this negotiation, only one-way negotiation is required to complete the allocation of the quantity of spatial streams of the cooperation STA associated with the first AP and the second AP.

Embodiment 3

This embodiment provides another method for negotiating cooperation configuration information between the first AP and the second AP.

Figure 6:
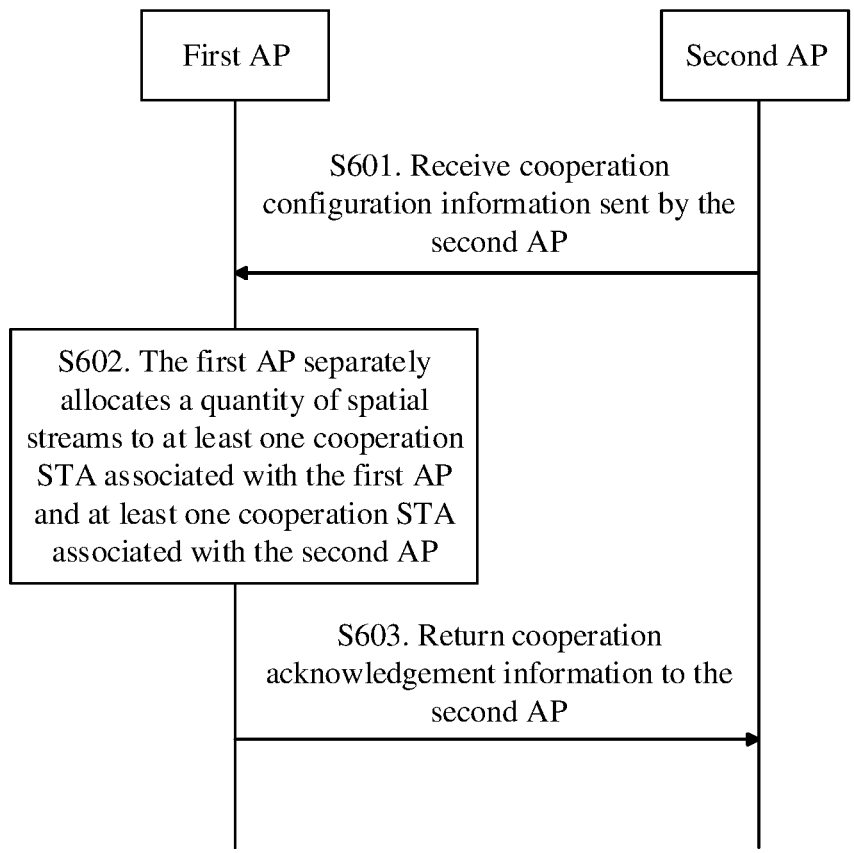
FIG. 6 is a schematic flowchart of another method for negotiating cooperation information according to an embodiment of the present application.

Referring to FIG. 6, the method may further include the following steps.

Step S601: The first AP receives cooperation configuration information sent by the second AP, where the cooperation configuration information of the second AP is used to indicate basic cooperation information of the second AP to the first AP.

Step S601 is the same as step S201, and is not described again herein.

Step S602: The first AP separately allocates the quantity of spatial streams to the at least one cooperation STA associated with the first AP and the at least one cooperation STA associated with the second AP.

Further, after receiving the cooperation configuration information sent by the second AP, the first AP may preferably consider allocating the quantity of spatial streams to the cooperation STA associated with the first AP, or may preferably meet the quantity of spatial streams allocated by the second AP to the cooperation STA associated with the second AP, or may comprehensively consider the quantity of spatial streams allocated by the first AP and the second AP to the cooperation STAs respectively associated with the first AP and the second AP.

Optionally, the first AP may preferably allocate the quantity of spatial streams to the cooperation STA associated with the first AP.

If the first AP needs to negotiate with the second AP to trigger the cooperation STA to perform uplink data transmission, and a total quantity of spatial streams allocated by the second AP to the cooperation STA associated with the second AP does not exceed an upper limit of a quantity of received spatial streams of the first AP, or when the AP needs to collaboratively perform downlink data transmission, and a quantity of spatial streams allocated by the second AP to the cooperation STA associated with the second AP does not exceed an upper limit of a quantity of received spatial streams of the cooperation STA associated with the first AP, the first AP preferably allocates the quantity of spatial streams to the cooperation STA associated with the first AP, and then reallocates, based on the cooperation configuration information of the second AP, a quantity of remaining available spatial streams to the cooperation STA associated with the second AP. If when the AP needs to collaboratively trigger the STA to perform uplink data transmission, and a total quantity of spatial streams allocated by the second AP to the cooperation STA associated with the second AP exceeds an upper limit of a quantity of received spatial streams of the first AP, or when the AP needs to collaboratively perform downlink data transmission, and a quantity of spatial streams allocated by the second AP to the cooperation STA associated with the second AP exceeds an upper limit of a quantity of received spatial streams of the cooperation STA associated with the first AP, the first AP allocates a quantity of all available spatial streams to the cooperation STA associated with the first AP, and does not allocate the quantity of spatial streams to the cooperation STA associated with the second AP.

Optionally, the first AP may further preferably meet the quantity of spatial streams allocated by the second AP to the cooperation STA associated with the second AP.

If the first AP needs to negotiate with the second AP to trigger the cooperation STA to perform uplink data transmission, and a total quantity of spatial streams allocated by the second AP to the cooperation STA associated with the second AP does not exceed an upper limit of a quantity of received spatial streams of the first AP, or if when the AP needs to collaboratively perform downlink data transmission, and a total quantity of spatial streams allocated by the second AP to the cooperation STA associated with the second AP does not exceed an upper limit of a quantity of received spatial streams of the cooperation STA associated with the first AP, the first AP preferably meets, based on the cooperation configuration information of the second AP, the quantity of spatial streams allocated by the cooperation STA associated with the second AP, and allocates a quantity of remaining available spatial streams to the cooperation STA associated with the first AP. If when the AP needs to collaboratively trigger the STA to perform uplink data transmission, and a total quantity of spatial streams allocated by the second AP to the cooperation STA associated with the second AP exceeds an upper limit of a quantity of received spatial streams of the first AP, or when the AP needs to collaboratively perform downlink data transmission, and a quantity of spatial streams allocated by the second AP to the cooperation STA associated with the second AP exceeds an upper limit of a quantity of received spatial streams of the cooperation STA associated with the first AP, the first AP sets, to zero, a quantity of associated cooperation STA that may be scheduled by the first AP, and does not allocate the quantity of spatial streams to any cooperation STA associated with the first AP.

Optionally, the first AP may further comprehensively consider the quantity of spatial streams allocated by the first AP and the second AP to the cooperation STAs respectively associated with the first AP and the second AP. Herein, a quantity of spatial streams allocated to each specific cooperation STA and a method for allocating the quantity of spatial streams are not limited. For example, the quantity of spatial streams allocated to each specific cooperation STA and the method for allocating the quantity of spatial streams may be determined based on an emergency degree of required-to-be-transmitted data of each cooperation STA, a time length for waiting uplink transmission, or a quantity of spatial streams actively sent by each cooperation STA to each AP, or may be determined based on a scheduling capability of each AP or another algorithm. However, when the first AP needs to negotiate with the second AP to trigger the cooperation STA to perform uplink data transmission, a sum of a quantity of spatial streams allocated by the cooperation STA associated with the first AP and the quantity of spatial streams allocated by the cooperation STA associated with the second AP do not exceed a smallest value of the upper limit of the quantity of received spatial streams of the first AP and the upper limit of the quantity of received spatial streams of the second AP. When the AP needs to collaboratively perform downlink data transmission, a sum of the quantity of spatial streams allocated by the first AP to the at least one cooperation STA associated with the first AP and the quantity of spatial streams allocated by the second AP to the at least one cooperation STA associated with the second AP does not exceed a smallest value of upper limits of quantities of received spatial streams of all cooperation STAs associated with the first AP and the second AP.

Step S603: The first AP returns cooperation acknowledgement information to the second AP, where the cooperation acknowledgement information includes at least the basic cooperation information of the first AP.

The basic cooperation information of the second AP includes AID of the at least one cooperation STA associated with the second AP, and the quantity of spatial streams allocated by the second AP to the at least one cooperation STA associated with the second AP, and the transmission time length.

Optionally, when the first AP preferably meets the quantity of spatial streams allocated by the cooperation STA associated with the second AP, the cooperation configuration information of the second AP does not need to be modified. The first AP adds the AID of the cooperation STA associated with the first AP and the information such as the quantity of spatial streams allocated by the first AP to the cooperation STA associated with the first AP, the MCS, and the transmission time length to the cooperation acknowledgement information of the first AP, and returns the cooperation acknowledgement information to the second AP after obtaining the channel usage right using channel contention.

Herein, a frame structure of the cooperation acknowledgement information may be the same as the frame structure of the cooperation configuration information. Details are not described herein again. Information included in a specific field is different: An RA field is set to a MAC address of the second AP, a TA field is set to a MAC address of the first AP, a STA AID in a cooperate STA is an AID of the cooperation STA associated with the first AP, and an SS allocation is information about the quantity of spatial streams allocated by the first AP to the cooperation STA associated with the first AP. Certainly, the frame structure of the cooperation acknowledgement information may further be another frame structure. Optionally, as shown in FIG. 7, the frame structure of the cooperation acknowledgement information may be further the same as a frame structure of a trigger frame such that the first AP and the second AP complete setting of trigger information when the first AP and the second AP subsequently jointly trigger and schedule the associated cooperation STAs respectively associated with the first AP and the second AP. The difference is that in a frame control field in the frame structure of the cooperation acknowledgement information, setting of a type field and a subtype subfield need to be separated from the trigger frame. Further, a user information field (User Info) includes parameters such as an AID, a quantity of spatial streams, and an MCS of at least one cooperation STA associated with the first AP.

Optionally, when the first AP preferably allocates the quantity of spatial streams to the cooperation STA associated with the first AP, in the cooperation configuration information of the second AP, information about a quantity of spatial streams that may be allocated to the cooperation STA associated with the second AP changes. The second AP adds, to the cooperation acknowledgement information, the basic cooperation information of the second AP and the basic cooperation information of the first AP that have been modified after reallocation, and returns the cooperation acknowledgement information to the second AP after obtaining the channel use right using channel contention.

Herein, a frame structure of the cooperation acknowledgement information may be the same as the frame structure of the cooperation configuration information. Details are not described herein again. Information included in a specific field is different: an RA field is set to a MAC address of the second AP, a TA field is set to a MAC address of the first AP, and a cooperative STA includes not only the AID and the information about the quantity of spatial stream of the cooperation STA associated with the first AP, but also an AID of at least one cooperation STA associated with the second AP and a quantity of spatial streams of at least one cooperation STA associated with the modified second AP after allocation. Optionally, the frame structure of the cooperation acknowledgement information is already provided in the foregoing first optional manner. Details are not described herein again. Further, the user information field includes parameters such as the AID, the quantity of spatial streams, and the MCS of the at least one cooperation STA associated with the first AP, and further includes parameters such as the AID, the quantity of spatial streams, and the MCS of the at least one cooperation STA associated with the second AP.

Therefore, the cooperation acknowledgement information returned by the first AP to the second AP herein may include one of the following cases: when the first AP does not modify the quantity of spatial streams allocated to the at least one cooperation STA associated with the second AP, the basic cooperation information of the first AP, or when the first AP reallocates and modifies the quantity of spatial streams of at least one cooperation STA associated with the second AP, the basic cooperation information of the first AP and the reallocated basic cooperation information of the second AP.

Herein, after two-way interaction and negotiation between the first AP and the second AP, the first AP and the second AP not only clearly understand the basic cooperation information of the first AP and the second AP, but also clearly understand the basic cooperation information of the first AP and the second AP each other.

In this embodiment, the second AP sends the cooperation configuration information that carries the basic cooperation information of the second AP to the first AP, and the first AP returns the cooperation acknowledgement information that carries at least the basic cooperation information of the first AP to the second AP such that the first AP and the second AP are interactively negotiated in a two-way manner, and subsequently, two APs cooperate to trigger each cooperation STA to perform parallel uplink data transmission or two APs cooperate to perform downlink data transmission to each cooperation STA.

Embodiment 4

This embodiment provides a process in which an AP triggers a plurality of users to perform uplink data transmission in parallel.

Figure 8:
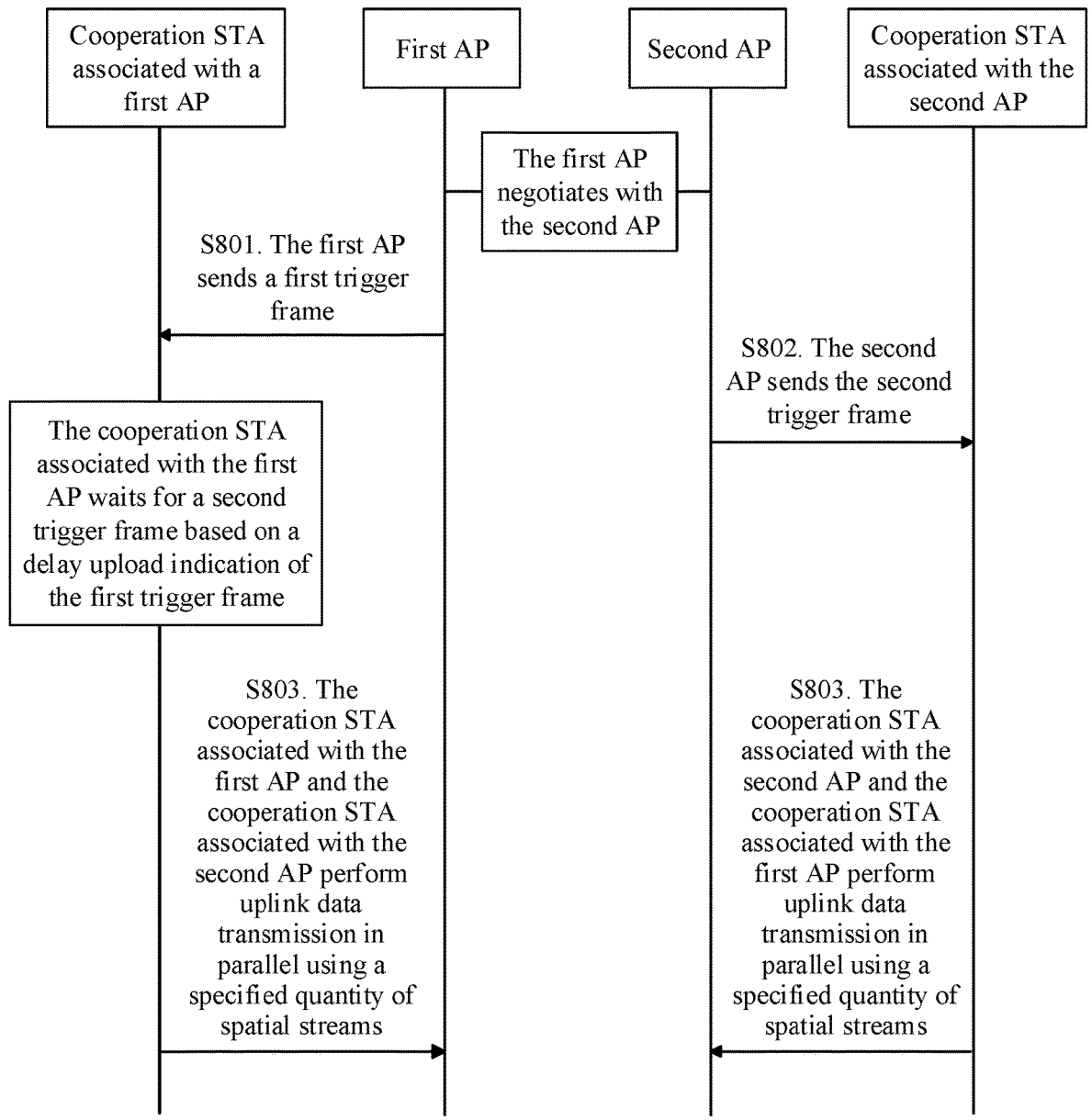
FIG. 8 is a schematic flowchart of a triggering method according to an embodiment of the present application.
Figure 9:
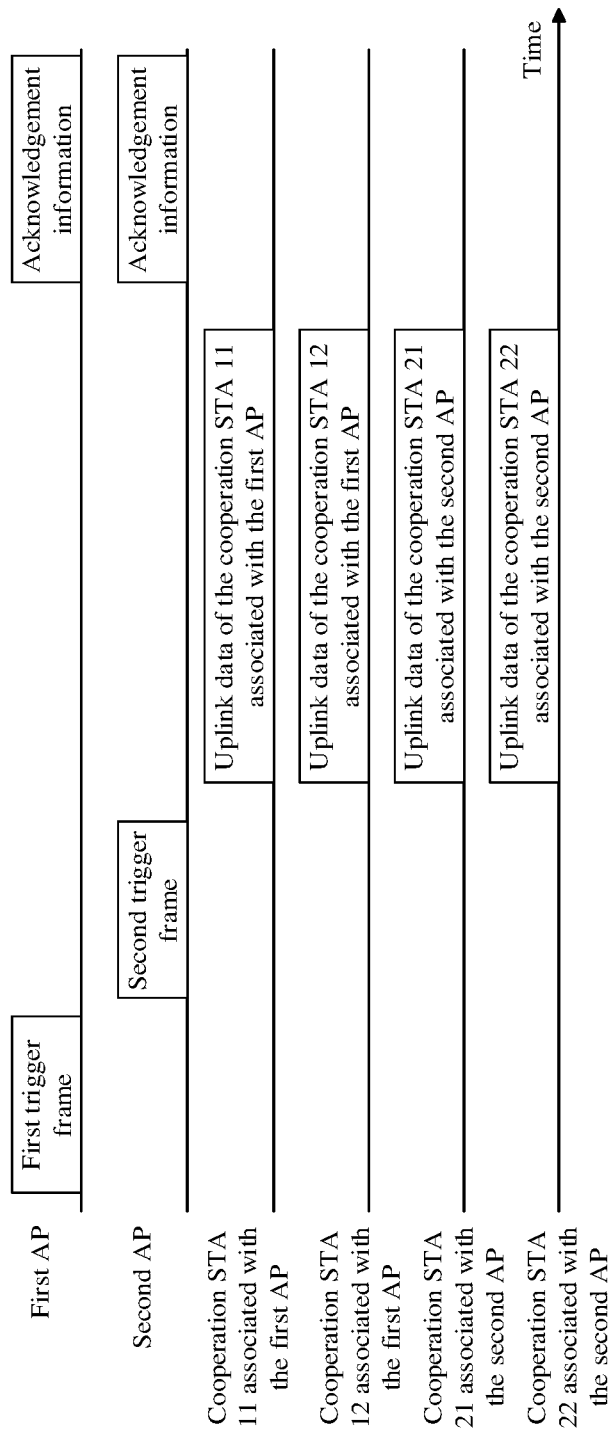
FIG. 9 is a schematic diagram of a time sequence of a triggering method according to an embodiment of the present application.

In another embodiment of the present application, after the first AP and the second AP negotiate to determine the cooperation configuration information, a schematic flowchart of triggering, by the first AP and the second AP, scheduling each cooperation STA to perform uplink transmission is shown in FIG. 8. A schematic diagram of a time sequence is shown in FIG. 9. The method may include the following steps.

Step S801: The first AP sends a first trigger frame to a cooperation STA associated with the first AP, where the first trigger frame is used to trigger at least one cooperation STA associated with the first AP to perform uplink data transmission using a specified quantity of spatial streams and a specified transmission time length after a specified delay.

Further, after the first AP performs pre-negotiation with the second AP to determine the cooperation configuration information, the first AP sends the first trigger frame in a broadcast manner. In this embodiment scenario, the cooperation configuration information needs to include a transmission time length (i.e., PPDU length) such that the first AP and the second AP separately trigger respective associated cooperation STAs to perform uplink data transmission in parallel.

Herein, the first trigger frame includes an AID, a quantity of spatial streams, and a transmission time length that are of the cooperation STA associated with the first AP and that are determined by negotiation, and further includes a delay upload indication. The first trigger frame is used to trigger the at least one cooperation STA associated with the first AP to perform uplink data transmission using a specified quantity of spatial streams and a specified transmission time length after a specified delay.

Optionally, the delay upload indication in the first trigger frame may be set on a reserved bit of a common information field in the trigger frame, and a location at which the reserved bit is located is shown in Table 1. For example, when the reserved bit in the common information field is set to 1, a triggered cooperation STA needs to delay uploading. When the reserved bit in the common information field is set to 0, a triggered cooperation STA does not need to delay uploading.

TABLE 1

| low-density parity-check (LDPC) extra Symbol | AP transmit (TX) power | Packet extension | Spatial reuse | Doppler | HE signal field A (HE-SIG-A) reserved | Reserved | Trigger dependent common info |
|---|---|---|---|---|---|---|---|
| Bits: 1 | 6 | 3 | 16 | 1 | 9 | 1 | Variable |

Optionally, as shown in Table 2, the delay upload indication in the first trigger frame may be further set in a reserved bit of a user information field in the trigger frame. For example, when the reserved bit in the user information field is set to 1, a triggered cooperation STA needs to delay uploading. When the reserved bit in the user information field is set to 0, a triggered cooperation STA does not need to delay uploading.

TABLE 2

| AID 12 | Resource unit (RU) allocation | Coding type | MCS | DCM | SS allocation | Target Received Signal Strength Indicator (RSSI) | Reserved | Trigger dependent user |
|---|---|---|---|---|---|---|---|---|
| Bits: 12 | 8 | 1 | 4 | 1 | 6 | 7 | 1 | Variable |

Step S802: The second AP sends a second trigger frame, where the second trigger frame is used to trigger the cooperation STA associated with the second AP to perform uplink data transmission using a specified quantity of spatial streams and a specified transmission time length.

Further, the second AP sends the second trigger frame in a broadcast manner. There is a SIFS time between the second trigger frame sent by the second AP and the first trigger frame sent by the first AP. The second trigger frame includes an AID, a quantity of spatial streams, and a transmission time length that are of the cooperation STA associated with the second AP and that are determined by negotiation, and is used to trigger the cooperation STA associated with the second AP to perform uplink data transmission using a specified quantity of spatial streams and a specified transmission time length, and the transmission time length specified by the first trigger frame is the same as the transmission time length specified by the second trigger frame.

Step S803: The cooperation STA associated with the first AP performs uplink data transmission in parallel with the cooperation STA associated with the second AP.

Further, after receiving the first trigger frame sent by the first AP, the cooperation STA associated with the first AP determines, based on the delay upload indication in the first trigger frame, whether a delay upload needs to be performed.

If a delay upload indication bit in the first trigger frame indicates that the cooperation STA associated with the first AP needs to delay uploading, the cooperation STA associated with the first AP delays a specified time, and after receiving the SIFS time of the second trigger frame sent by the second AP (the cooperation AP), the cooperation STA associated with the first AP performs, using the quantity of spatial streams and the transmission time length allocated to the first trigger frame, uplink data transmission with the cooperation STA associated with the second AP in parallel using the quantity of spatial streams and the transmission time length allocated to the second trigger frame.

Figure 10:
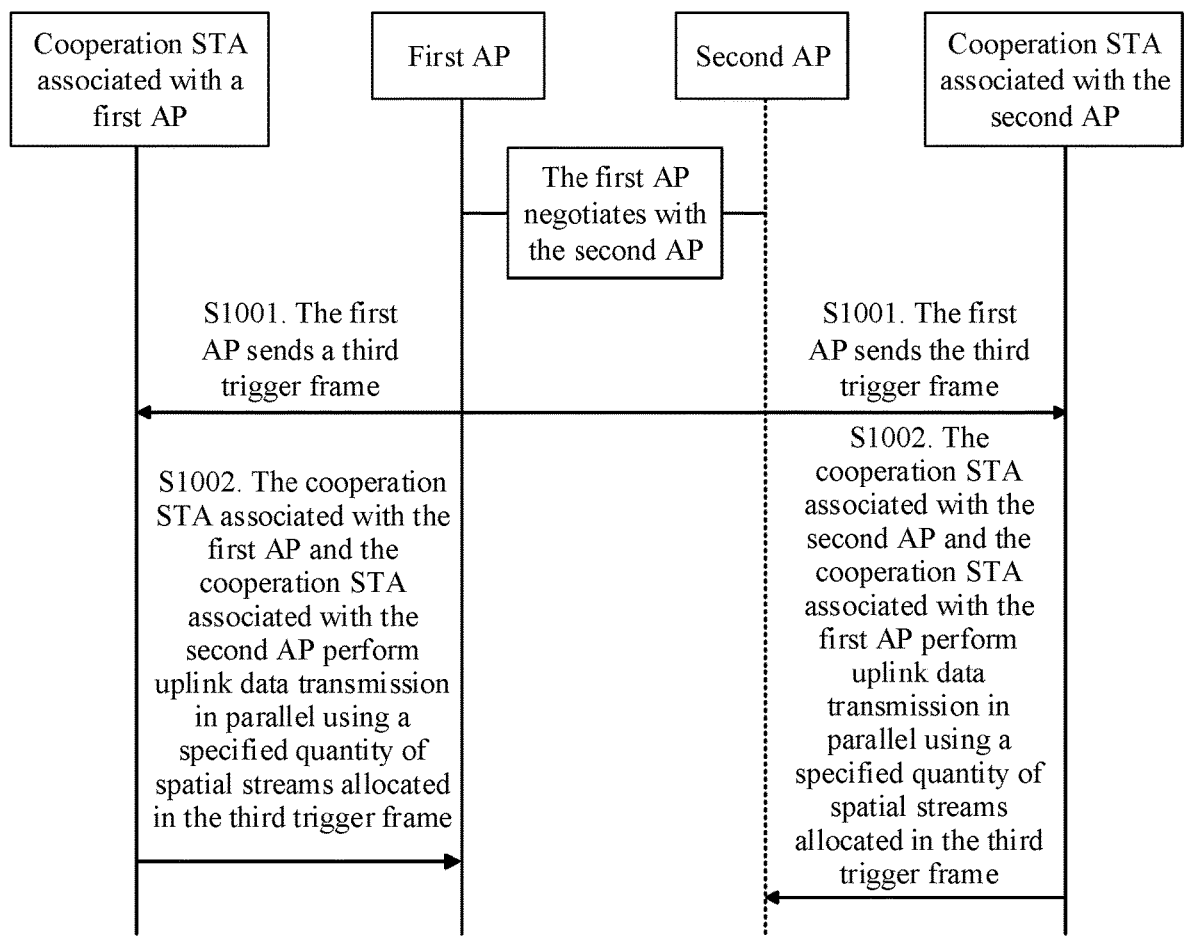
FIG. 10 is a schematic flowchart of another triggering method according to an embodiment of the present application.
Figure 11:
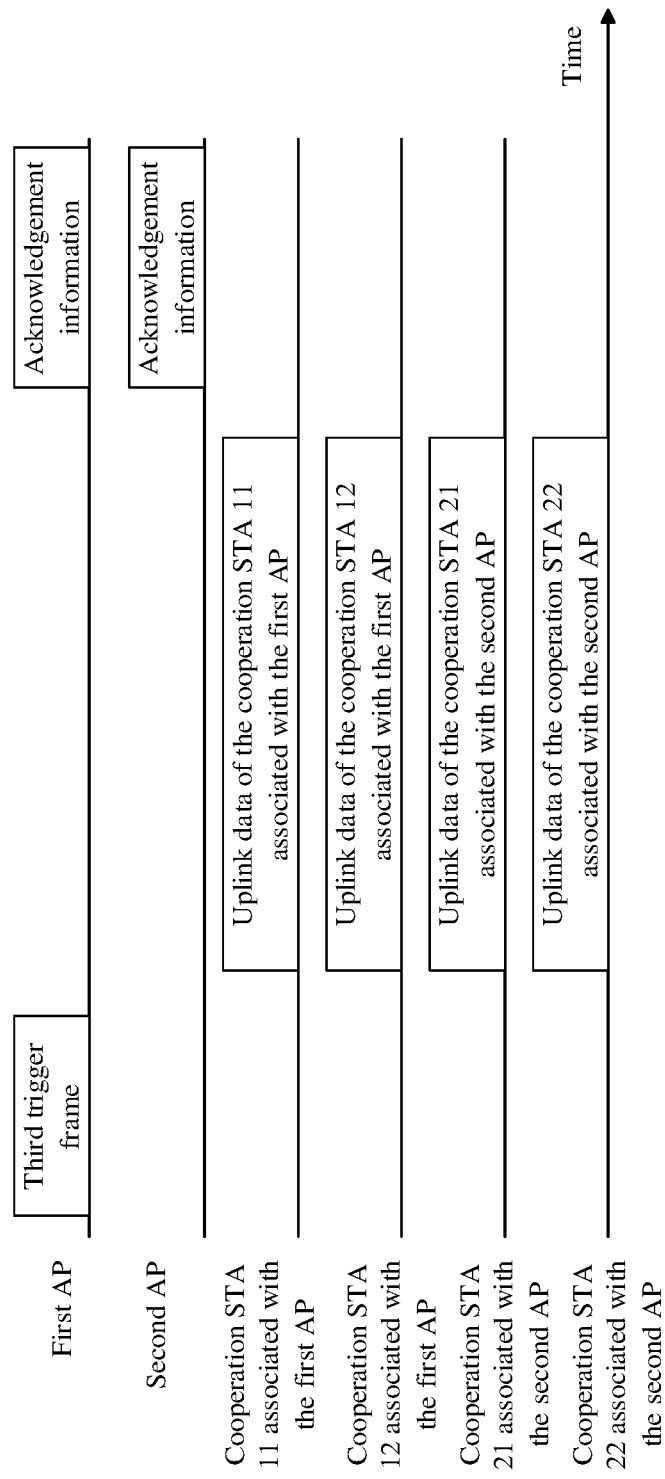
FIG. 11 is a schematic diagram of a time sequence of another triggering method according to an embodiment of the present application.

In Embodiment 5, after the first AP and the second AP negotiate to determine the cooperation configuration information, a schematic flowchart of triggering, by the first AP and the second AP, scheduling each STA to perform uplink data transmission in parallel may further be shown in FIG. 10. A schematic diagram of a time sequence is shown in FIG. 11. The method may include the following steps.

Step S1001: The first AP sends a third trigger frame to the at least one cooperation STA associated with the first AP and the at least one cooperation STA associated with the second AP.

The first AP sends, in a broadcast manner based on the cooperation configuration information determined by negotiation in advance, the third trigger frame to the cooperation STA associated with the first AP and the cooperation STA associated with the second AP in order to trigger all the cooperation STAs associated with the first AP and the second AP to simultaneously perform uplink data transmission, where the third trigger frame includes information such as an AID and a quantity of available spatial streams of the cooperation STA associated with the first AP, and further includes information such as an AID and a quantity of available spatial streams of the cooperation STA associated with the second AP. In this embodiment scenario, the first AP triggers the cooperation STA associated with the first AP and the cooperation STA associated with the second AP to perform uplink data transmission in parallel. Therefore, the cooperation configuration information sent by the second AP to the first AP may not include a transmission time length (PPDU length) field allocated by the second AP to the at least one cooperation STA associated with the second AP, and the first AP uniformly sets the uplink transmission time length when sending the third trigger frame.

To ensure that the first AP can accurately trigger all the cooperation STAs associated with the first AP and the second AP, uniqueness of association identifiers AID of the triggered cooperation STAs needs to be ensured. The method for ensuring uniqueness of the AID of the cooperation STA associated with the first AP and the AID of the cooperation STA associated with the second AP may be implemented before the first AP and the second AP determine the cooperation information, or may be implemented in a process in which the first AP and the second AP trigger scheduling.

Optionally, before the first AP and the second AP determine the cooperation information, it is ensured that different AIDs are allocated by the first AP and the second AP to respective associated cooperation STAs.

Further, the first AP and the second AP may divide the AID into two or more non-overlapping segment intervals. The first AP and the second AP may separately allocate only the AID in a specific interval to the cooperation STA respectively associated with the first AP and the second AP. The specific interval herein may be any two different segment intervals, or may be any plurality of different segment intervals. For example, the first AP may allocate the AID to the at least one cooperation STA associated with the first AP in a first AID segment interval, and the second AP may allocate the AID to the at least one cooperation STA associated with the second AP in a second AID segment interval. The first AID segment interval does not overlap the second AID segment interval.

Optionally, in a process in which the first AP and the second AP trigger scheduling, AID differentiation may be implemented by including an identifier in the trigger information.

Further, AID information in the user information field of the trigger frame includes 12 bits, where a lower 11 bits are used to indicate a specific value of the AID, and a highest bit is a reserved bit. For example, as shown in Table 3, in the third trigger frame sent by the first AP, lower 11 bits in the AID field may be selected to represent the AID information of the cooperation STA, and a highest reserved bit in the AID field is selected as an identifier to indicate an association BSS in which the cooperation STA is located. For example, when a highest reserved bit in the AID field is set to 0, it indicates that the cooperation STA is a STA associated with the BSS. When the reserved bit is set to 1, it indicates that the cooperation STA is not a STA associated with the BSS. Therefore, in this case, in a process in which the first AP and the second AP triggers scheduling, AID information of the cooperation STA associated with the two APs may be distinguished, and the cooperation STA can be accurately triggered to perform uplink data transmission.

TABLE 3

| AID 12 | |
| --- | --- |
| ID | Reserved |
| 11 bits | 1 bit |

Step S1002: The cooperation STA associated with the first AP and the cooperation STA associated with the second AP perform uplink data transmission in parallel based on the quantity of spatial streams allocated in the third trigger frame.

To ensure that the cooperation STA associated with the first AP and the cooperation STA associated with the second AP can successfully parse the trigger scheduling information sent by the cooperation AP, before determining the cooperation information, the first AP and the second AP need to notify the cooperation STA associated with the first AP and the cooperation STA associated with the second AP of a BSS color and a MAC address of the cooperation AP in which the scheduled cooperation AP is triggered.

The cooperation STA associated with the first AP receives the third trigger frame, and performs uplink data transmission in parallel with the cooperation STA associated with the second AP based on the quantity of spatial streams and the transmission time length allocated to the cooperation STA based on the third trigger frame.

The cooperation STA associated with the second AP receives the third trigger frame sent by the first AP (the cooperation AP), identifies a BSS color and a MAC address in the third trigger frame, determines that the third trigger frame is not another trigger frame sent by another AP in the BSS, but a third trigger frame sent by a cooperation AP (the first AP), and performs, based on a quantity of spatial streams and a transmission time length that are allocated to the cooperation STA associated with the second AP in the third trigger frame, uplink data transmission in parallel with the cooperation STA associated with the first AP.

Figure 12:
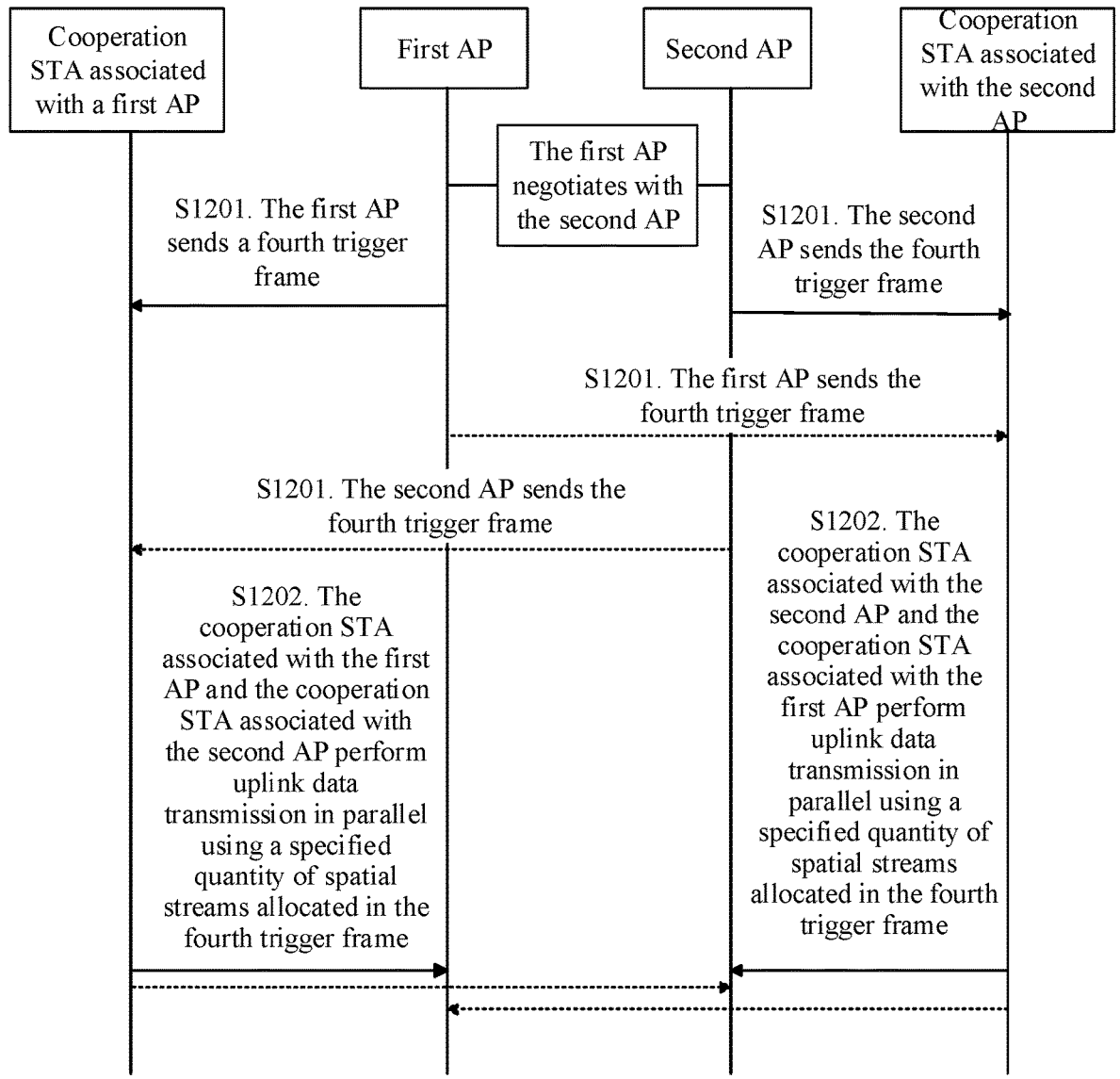
FIG. 12 is a schematic flowchart of another triggering method according to an embodiment of the present application.
Figure 13:
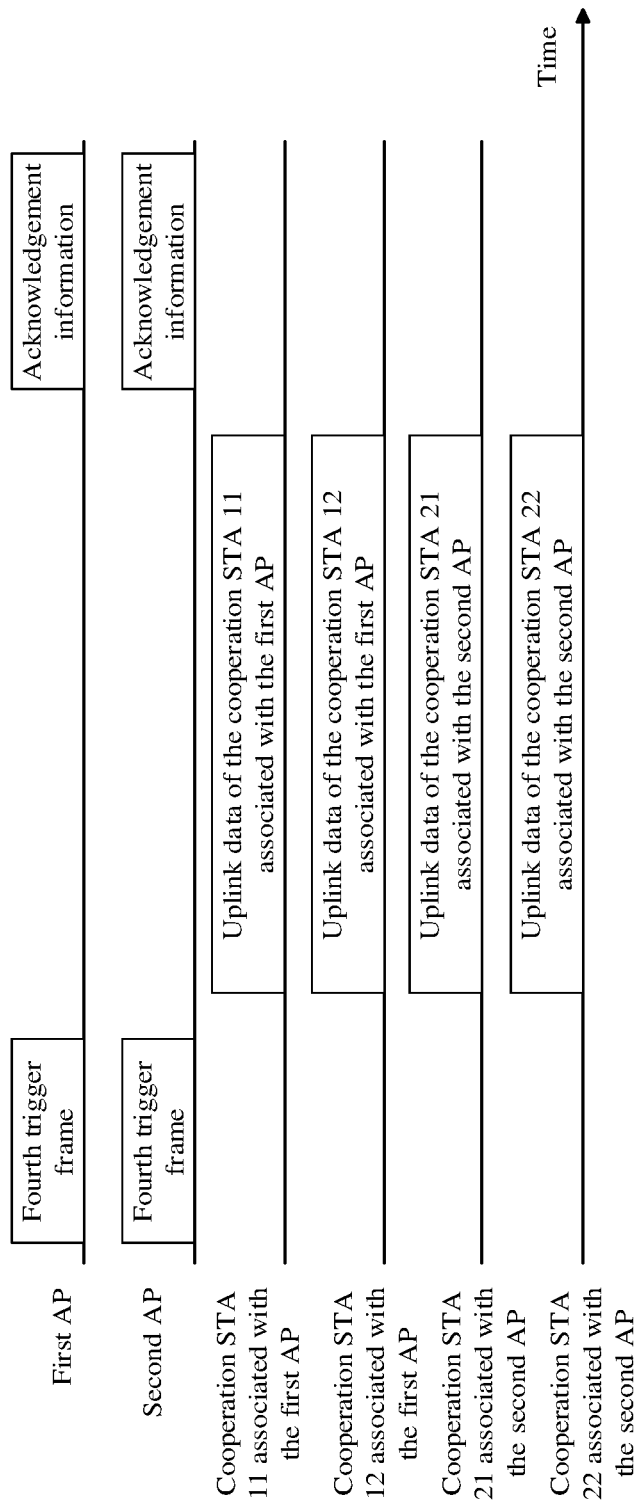
FIG. 13 is a schematic diagram of a time sequence of another triggering method according to an embodiment of the present application.

In Embodiment 6, after the first AP and the second AP negotiate to determine the cooperation configuration information, a schematic flowchart of triggering, by the first AP and the second AP, scheduling each cooperation STA to perform uplink data transmission in parallel may further be shown in FIG. 12. A diagram of a time sequence is shown in FIG. 13. The method may further include the following steps.

Step S1201: The first AP and the second AP separately simultaneously send a fourth trigger frame to a cooperation STA in the first AP and a cooperation STA in the second AP, where the fourth trigger frame is used to trigger the cooperation STAs to perform uplink data transmission in parallel.

The first AP and the second AP separately simultaneously send, in a broadcast manner based on the cooperation configuration information determined by negotiation in advance, a same fourth trigger frame to the cooperation STA associated with the first AP and the cooperation STA associated with the second AP in order to trigger all cooperation STAs associated with the first AP and the second AP to perform uplink data transmission in parallel, where the fourth trigger frame includes information such as an AID, a quantity of available spatial streams, and a transmission time length of the cooperation STA associated with the first AP, and further includes information such as an AID, a quantity of available spatial streams, and a transmission time length of the cooperation STA associated with the second AP, and the transmission time length allocated to the cooperation STA associated with the first AP is the same as the transmission time length allocated to the cooperation STA associated with the second AP. In this embodiment, the first AP and the second AP simultaneously send the fourth trigger frame to schedule cooperation STAs to perform uplink data transmission in parallel. Therefore, the cooperation configuration information sent by the second AP needs to include a PPDU length field of the cooperation STA associated with the second AP, and after receiving the cooperation configuration information sent by the second AP, the first AP needs to return cooperation acknowledgement information to the second AP. The cooperation acknowledgement information also needs to include a transmission time length (i.e., PPDU length) field of the cooperation STA associated with the first AP, and further needs to include all necessary data information that facilitates the first AP and the second AP to perform a same setting on the fourth trigger frame.

In addition, to avoid a conflict between the first AP and the fourth trigger frame sent by the second AP, a MAC address of the fourth trigger frame needs to be set to a MAC address of either of the first AP and the second AP, and a scrambling code seed randomly generated for scrambling the fourth trigger frame sent by the first AP also needs to be consistent with that in the fourth trigger frame sent by the second AP in order to ensure that the fourth trigger frame sent by the first AP is completely consistent with the fourth trigger frame sent by the second AP.

As same as in the foregoing step S1001, in step S1201, to ensure that the first AP can accurately trigger all the cooperation STAs associated with the first AP and the second AP, that an associated identifier AID of the triggered cooperation STA is unique also needs to be ensured. In this step, implementation of AID uniqueness is the same as that described in step S801. Details are not described herein again.

Step S1202: The cooperation STA associated with the first AP and the cooperation STA associated with the second AP perform uplink data transmission in parallel based on the quantity of spatial streams allocated in the fourth trigger frame.

As same as step S1002, in this step 1202, that the cooperation STA associated with the first AP and the cooperation STA associated with the second AP can successfully parse the trigger scheduling information sent by the cooperation AP also needs to be ensured, before determining the cooperation information, the first AP and the second AP need to notify the cooperation STA associated with the first AP and the cooperation STA associated with the second AP of a BSS color and a MAC address of the cooperation AP in which the scheduled cooperation AP is triggered.

Further, the cooperation STA associated with the first AP receives the fourth trigger frame, identifies the BSS color and the MAC address in the fourth trigger frame, and ensures that the fourth trigger frame is not another trigger frame sent by the other AP in the BSS, but is a fourth trigger frame sent by the AP (the first AP) associated with the cooperation STA or the AP (the second AP) involved in the cooperation, and performs, based on the quantity of spatial streams and the transmission time length that are allocated to the cooperation STA associated with the first AP based on the fourth trigger frame, uplink data transmission with the cooperation STA associated with the second AP.

The cooperation STA associated with the second AP receives the fourth trigger frame, identifies the BSS color and the MAC address in the fourth trigger frame, and ensures that the fourth trigger frame is not another trigger frame sent by the other AP in the BSS, but is a fourth trigger frame sent by the AP (the second AP) associated with the cooperation STA or the AP (the first AP) involved in the cooperation, and performs, based on the quantity of spatial streams and the transmission time length that are allocated to the cooperation STA associated with the second AP based on the fourth trigger frame, uplink data transmission in parallel with the cooperation STA associated with the first AP.

Embodiment 7 provides a process in which an AP receives uplink data sent in parallel by each cooperation STA and returns to acknowledgement information.

In another embodiment of the present application, after each AP receives uplink data of each cooperation STA, the method may further include, after parsing the uplink data sent by the cooperation STA associated with the first AP, the first AP returns acknowledgement information to the cooperation STA associated with the first AP, and after parsing the uplink data of the cooperation STA associated with the second AP, the second AP returns acknowledgement information to the cooperation STA associated with the second AP.

The first AP and the second AP have a plurality of manners of returning the acknowledgement information.

In an optional manner, the first AP and the second AP may sequentially and serially return acknowledgement information to the STAs associated with the first AP and the second AP in terms of time. There is a time interval between the first AP and the second AP in terms of response the acknowledgement information. A time sequence of the first AP and the second AP in terms of response acknowledgement information is not limited, and may be determined by negotiation by the first AP and the second AP. For example, the first AP first returns acknowledgement information or block acknowledgement (BA) information to the at least one cooperation STA associated with the first AP, and then the second AP returns acknowledgement information or BA information to the cooperation STA associated with the second AP.

In another optional manner, the first AP and the second AP add the acknowledgement information to a data field of an HE MU PPDU frame, and send, using orthogonal frequency-division multiple access (OFDMA), the acknowledgement information to each associated STA in parallel. According to the cooperation information determined by negotiation in advance, the first AP and the second AP perform a same setting on a legacy short training field (L-STF), a legacy long training field (L-LTF), a legacy signal field (L-SIG), an R-SIG field, an HE-SIG-A field, and an HE signal B (HE-SIG-B) field of the HE MU PPDU frame, where a BSS color of the HE-SIG-A field in the HE MU PPDU of the first AP and a BSS color of the HE-SIG-A field in the HE MU PPDU of the second AP should be set to a same BSS color, and the BSS color may be set, after negotiation, as a BSS color of a BSS in which either of the first AP and the second AP is located, or may be selected as a fixed BSS color after negotiation.

Figure 14:
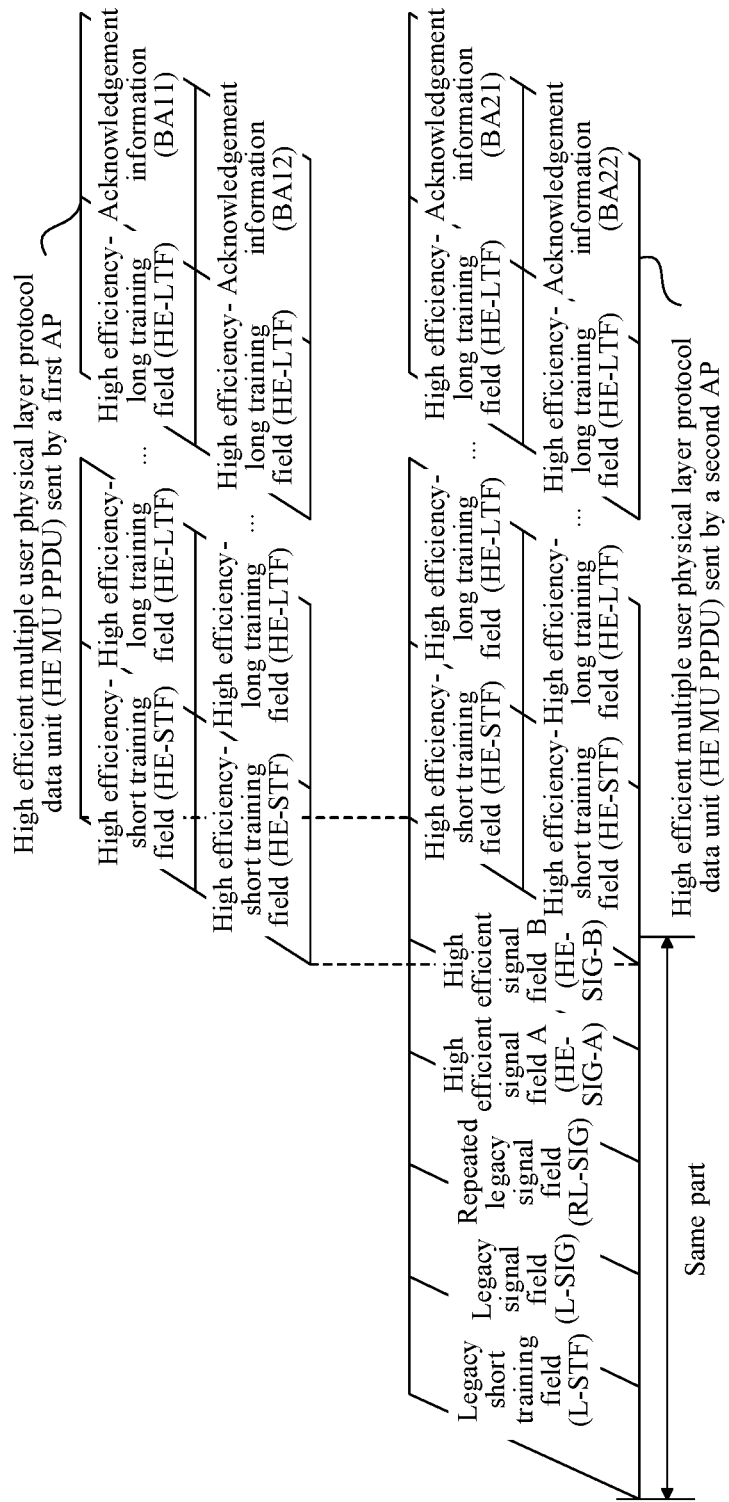
FIG. 14 is a schematic diagram of a frame structure of an HE MU PPDU according to an embodiment of the present application.

Differently, the HE-STF and HE-LTF of the HE MU PPDU of the first AP carry a resource unit allocated by the first AP to the cooperation STA associated with the first AP, the resource unit includes a time-frequency resource allocated by the first AP to the associated cooperation STA, and the data field includes acknowledgement information returned by the first AP to a corresponding associated STA. The HE-STF and the HE-LTF of the HE MU PPDU of the second AP include a resource unit allocated by the second AP to the cooperation STA associated with the second AP, and the data field includes acknowledgement information returned by the second AP to a corresponding associated STA. A frame format of the acknowledgement information carried in the HE MU PPDU may be shown in FIG. 14.

Figure 15:
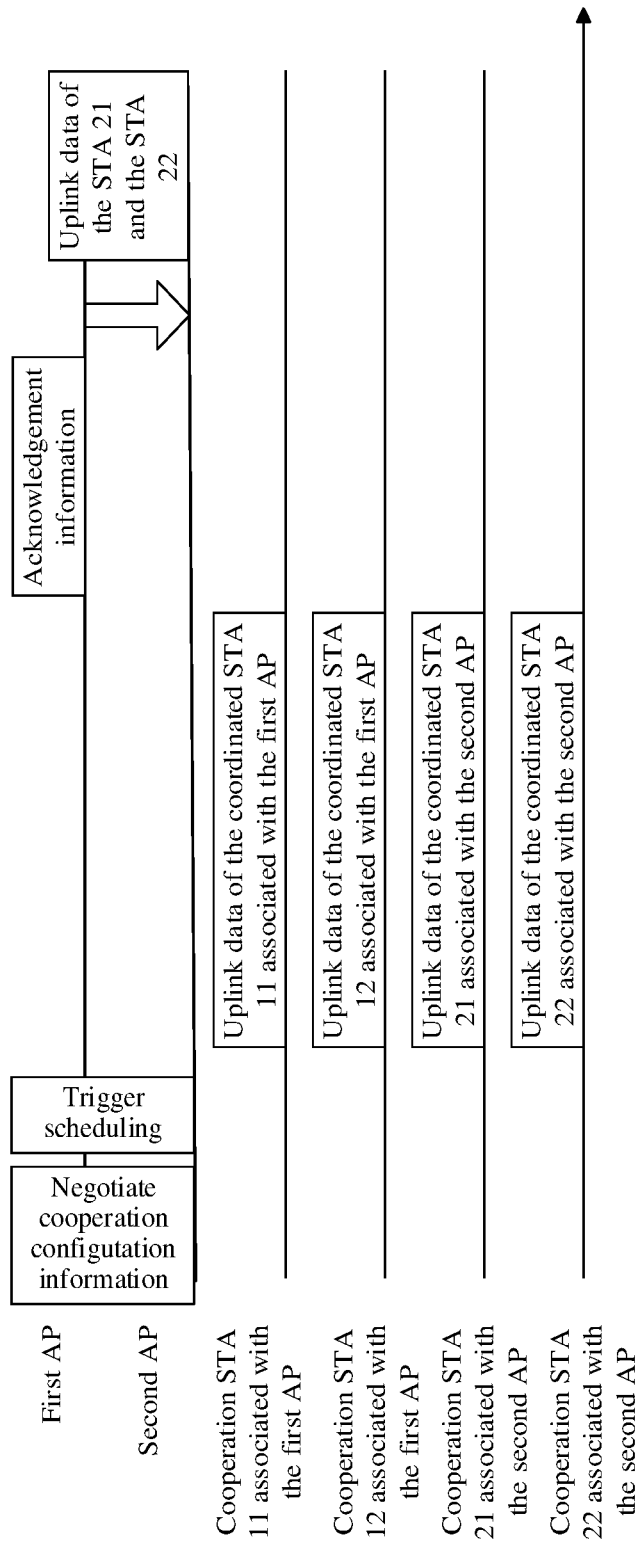
FIG. 15 is a schematic flowchart of a time sequence of an uplink data transmission method according to an embodiment of the present application.

Optionally, as shown in FIG. 15, the first AP may further parse the uplink data sent by the cooperation STA associated with the first AP, and also parse the uplink data sent by the cooperation STA associated with the second AP. The first AP then returns the acknowledgement information to all the cooperation STAs associated with the first AP and the second AP, and forwards the uplink data of the demodulated cooperation STA associated with the second AP to the second AP using a backhaul or another channel or manner. A reply of the acknowledgement information may also be in an HE MU PPDU frame format, where the HE MU PPDU carries the acknowledgement information of the at least one cooperation STA associated with the first AP and the acknowledgement information of the at least one cooperation STA associated with the second AP.

Embodiment 8 provides a method in which an AP collaboratively performs downlink data transmission.

Figure 16:
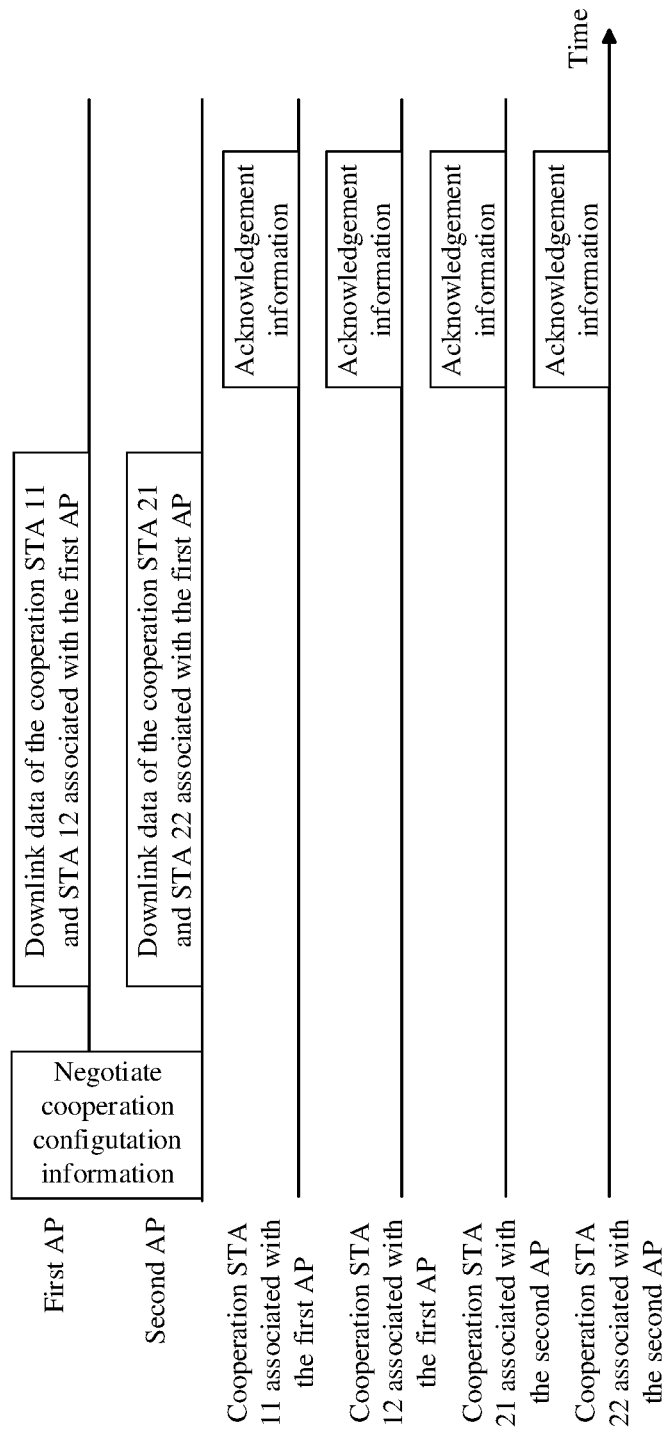
FIG. 16 is a schematic flowchart of a time sequence of a downlink data transmission method according to an embodiment of the present application.

After the first AP and the second AP negotiate to determine the cooperation configuration information, the first AP and the second AP perform downlink data transmission to each cooperation STA in parallel, and the method may further include the following as shown in FIG. 16.

The first AP and the second AP send, based on predetermined cooperation configuration information, downlink data to a plurality of cooperation STAs associated with the first AP and the second AP in parallel using MU-MIMO using the frame format of the HE MU PPDU. Using a previous bidirectional negotiation between the first AP and the second AP, a preamble of the HE MU PPDU sent by the first AP is the same as a preamble of the HE MU PPDU sent by the second AP, a quantity of HE-LTFs in the preamble is a sum of a quantity of downlink spatial streams allocated by the first AP and the second AP, and sequences used by each HE-LTF are orthogonal to each other such that a cooperation STA can accurately estimate channel information of all spatial streams and parse downlink data corresponding to the cooperation STA. The data field of the HE MU PPDU sent by the first AP includes downlink data that needs to be sent by the first AP to the at least one cooperation STA associated with the first AP, and the data field of the HE MU PPDU sent by the second AP includes downlink data that needs to be sent by the second AP to the at least one cooperation STA associated with the second AP. In this embodiment, the first AP and the second AP simultaneously send downlink data to each cooperation STA associated with the first AP and the second AP. Therefore, both the cooperation configuration information and the cooperation acknowledgement information need to include a transmission time length (i.e., PPDU length) field of the data that is sent downlink by the first AP.

The cooperation STA associated with the first AP receives and parses the downlink data sent by the first AP and return acknowledgement information, and the cooperation STA associated with the second AP receives the downlink data sent by the second AP and return acknowledgement information.

The cooperation STA associated with the first AP and the cooperation STA associated with the second AP have a plurality of manners of returning the acknowledgement information.

Optionally, as shown in a schematic diagram 16 of a time sequence, the cooperation STA associated with the first AP and the cooperation STA associated with the second AP may add corresponding acknowledgment information to a frame format of an HE TB PPDU, and return the acknowledgment information in parallel in an OFDMA manner. When the cooperation STA associated with the first AP return the acknowledgment information, an RU used in the HE TB PPDU may be indicated in the HE MU PPDU sent by the first AP, and when the cooperation STA associated with the second AP returns the acknowledgment information, an RU used in the HE TB PPDU may be indicated in the HE TB PPDU sent by the second AP.

Optionally, the cooperation STA associated with the first AP and the cooperation STA associated with the second AP may further sequentially and serially return to the acknowledgement information. A sequence of returning the acknowledgement information by the cooperation STA associated with the first AP and the cooperation STA associated with the second AP may be indicated in the HE MU PPDU sent by the first AP and the second AP. For example, the data part of the HE MU PPDU sent by the first AP may be used to indicate that the cooperation STA associated with the first AP returns the acknowledgement information immediately after receiving the downlink data, and the data part of the HE MU PPDU sent by the second AP may be used to indicate that the cooperation STA associated with the second AP returns the acknowledgement information after receiving the downlink data. A specific indication sequence and manner are not limited in this embodiment of the present application.

Embodiment 8 provides another method in which an AP collaboratively performs downlink data transmission.

Figure 17:
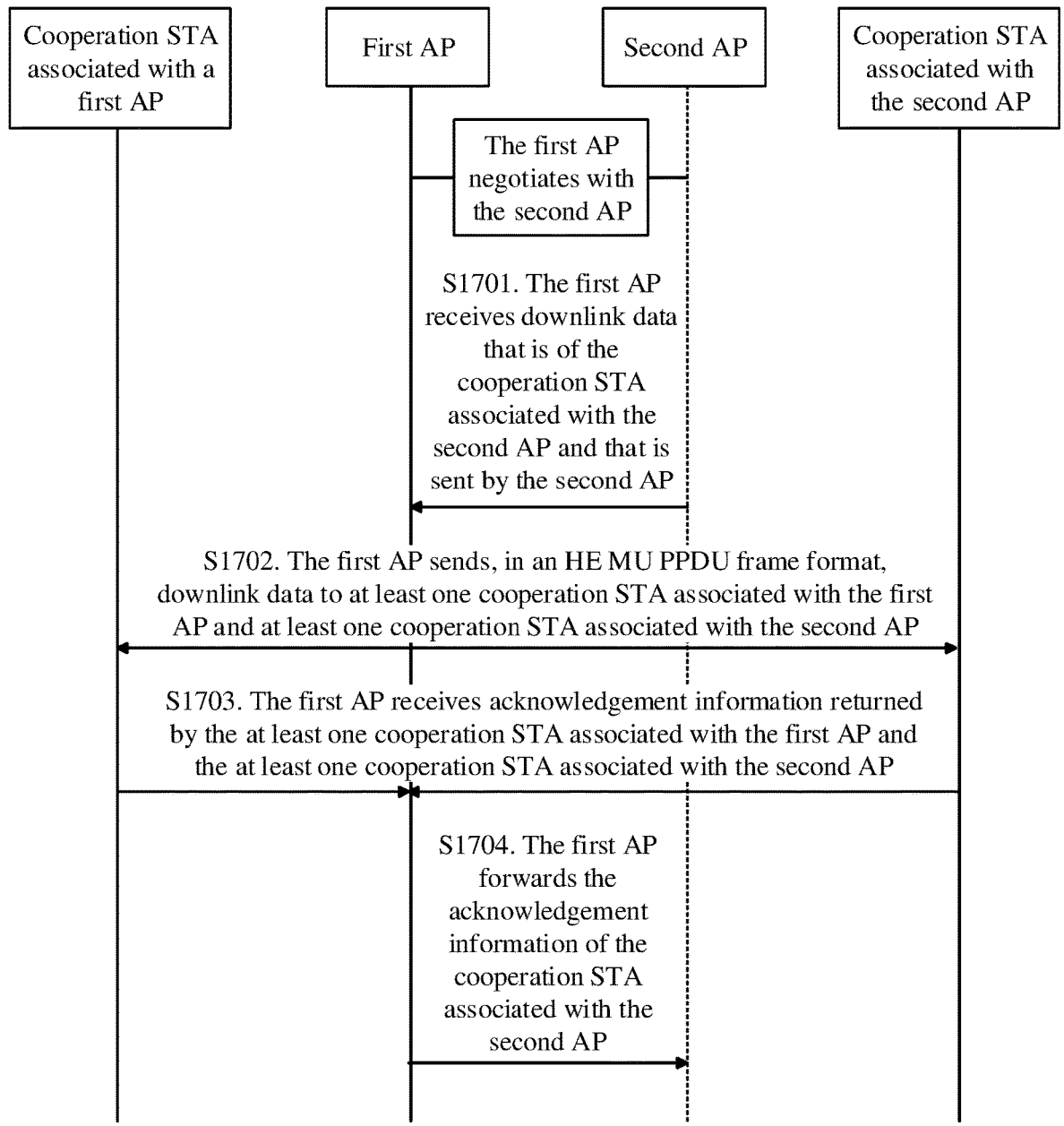
FIG. 17 is a schematic flowchart of another downlink data transmission method according to an embodiment of the present application.
Figure 18:
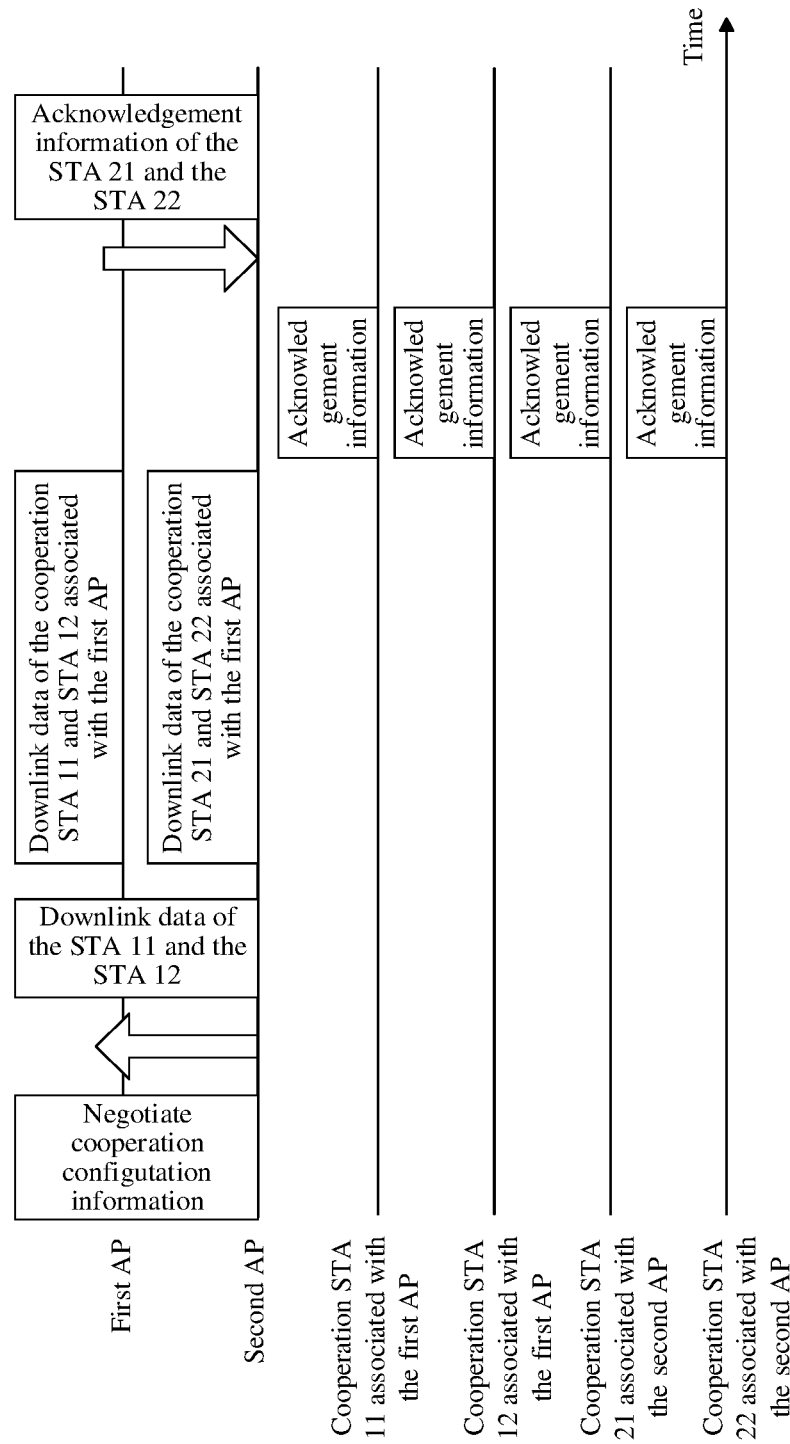
FIG. 18 is a schematic flowchart of a time sequence of another downlink data transmission method according to an embodiment of the present application.

After the first AP and the second AP negotiate to determine the cooperation configuration information, a schematic flowchart of performing, by the first AP and the second AP, uplink data transmission in parallel to each cooperation STA may further be shown in FIG. 17. A diagram of a time sequence is shown in FIG. 18. The method may further include the following steps.

Step S1701: The second AP forwards downlink data of at least one cooperation STA associated with the second AP to the first AP.

The second AP may forward, using a backhaul or another channel, the data associated with the second AP to the first AP.

Step S1702: The first AP sends, using the frame format of the HE MU PPDU and using a quantity of spatial streams that are correspondingly allocated by negotiation, the downlink data to the at least one cooperation STA associated with the first AP and the at least one cooperation STA associated with the second AP.

The first AP adds the downlink data of the at least one cooperation STA associated with the second AP and the downlink data of the cooperation STA associated with the first AP that are forwarded by the second AP to the HE MU PPDU, and performs downlink data transmission in a MIMO manner. Similarly, in order that each cooperation STA can accurately receive data of each cooperation STA, uniqueness of an AID of each cooperation STA needs to be ensured. Implementation of the uniqueness of the AID is the same as that described in step S801. Details are not described herein again. In this embodiment, the first AP sends downlink data to all cooperation STAs, and the transmission duration may be uniformly set by the first AP. Therefore, the cooperation configuration information sent by the second AP may not include the transmission time length field of the cooperation STA associated with the second AP.

Step S1703: The first AP receives the first acknowledgement information returned by the at least one cooperation STA associated with the first AP, and further receives second acknowledgement information returned by the at least one cooperation STA associated with the second AP.

The cooperation STA associated with the first AP and the cooperation STA associated with the second AP receive the HE MU PPDU sent by the first AP, parse out downlink data of the cooperation STA associated with the first AP and the cooperation STA associated with the second AP from the HE MU PPDU, and separately return acknowledgement information to the first AP. Similarly, the cooperation STA associated with the first AP and the cooperation STA associated with the second AP have a plurality of manners of returning the acknowledgment information, and may return the acknowledgment information to the first AP in parallel using the frame format of the HE TB PPDU, or may successively return the acknowledgment information to the first AP in a serial manner. This is not limited in the present application.

Step S1704: The first AP forwards, to the second AP, the acknowledgement information returned by the cooperation STA associated with the second AP.

After receiving the acknowledgement information returned by the cooperation STA associated with the first AP and the cooperation STA associated with the second AP, the first AP may forward, to the second AP using the backhaul or another channel, the acknowledgement information returned by the cooperation STA associated with the second AP.

Embodiment 10 provides another method in which an AP collaboratively performs downlink data transmission.

After the first AP and the second AP negotiate to determine the cooperation configuration information, the first AP and the second AP perform downlink data transmission to each cooperation STA in parallel, and the method may further include:

After receiving the downlink data of the at least one cooperation STA associated with the second AP that is forwarded by the second AP using the backhaul or another channel, the first AP forwards the downlink data of the at least one cooperation STA associated with the first AP to the second AP using the backhaul or another channel.

The first AP and the second AP simultaneously send a same HE MU PPDU to the at least one cooperation STA associated with the first AP and the at least one cooperation STA associated with the second AP, where a data field of the HE MU PPDU carries not only downlink data of the at least one cooperation STA associated with the first AP, but also downlink data of the at least one cooperation STA associated with the second AP. Further, the BSS color in the HE-SIG-A field of the HE MU PPDU may be a BSS color of any one of the first AP and the second AP, or may be a fixed BSS color selected after negotiation. To ensure that each cooperation STA can accurately identify, in the HE MU PPDU, downlink data sent by an associated AP to each cooperation STA, uniqueness of an AID of each cooperation STA needs to be ensured. A uniqueness assurance method is already described in detail in step S801. Details are not described herein again. In this embodiment, because the first AP and the second AP need to simultaneously send the HE MU PPDU to perform downlink data transmission, bidirectional negotiation between the first AP and the second AP needs to be performed. Both the cooperation configuration information sent by the second AP and the cooperation acknowledgement information returned by the first AP need to include a transmission time length field.

Figure 19:
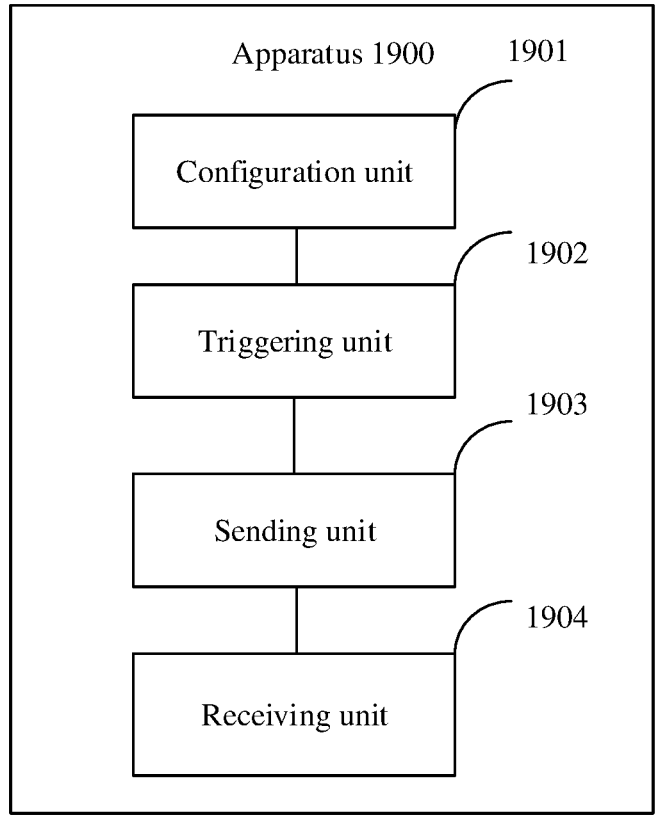
FIG. 19 is a schematic structural diagram of an apparatus according to an embodiment of the present application.

An embodiment of the present application provides an apparatus 1900 for data transmission, such as a chip complying with a series of 802.11 standards or an AP. FIG. 19 is a schematic structural diagram of the apparatus 1900. The apparatus 1900 may include a configuration unit 1901 configured to receive cooperation configuration information sent by a second AP, where the cooperation configuration information of the second AP is used to indicate basic cooperation information of the second AP to the apparatus 1900 and a triggering unit 1902 configured to trigger, using a quantity of spatial streams allocated by the first AP to at least one cooperation STA associated with the first AP, the at least one cooperation STA associated with the first AP to perform uplink data transmission, where a sum of the quantity of spatial streams allocated by the first AP to the at least one cooperation STA associated with the first AP and a quantity of spatial streams allocated by the second AP to at least one cooperation STA associated with the second AP does not exceed a smaller value of an upper limit of a quantity of received spatial streams of the first AP and an upper limit of a quantity of received spatial streams of the second AP, or a sending unit 1903 configured to transmit, using a quantity of spatial streams allocated by the first AP to at least one cooperation STA associated with the first AP, downlink data to the at least one cooperation STA associated with the first AP, where a sum of the quantity of spatial streams allocated by the first AP to the at least one cooperation STA associated with the first AP and a quantity of spatial streams allocated by the second AP to at least one cooperation STA associated with the second AP does not exceed a smallest value of upper limits of quantities of received spatial streams of all cooperation STAs associated with the first AP and the second AP.

Optionally, in another embodiment of the present application, the configuration unit 1901 may be further configured to allocate a quantity of remaining spatial streams to the at least one cooperation STA associated with the first AP, where the quantity of remaining spatial streams is a quantity of remaining spatial streams that can be allocated after the second AP allocates the second quantity of spatial streams to the at least one cooperation STA associated with the second AP.

Optionally, in another embodiment of the present application, the configuration unit 1901 may be further configured to separately allocate a quantity of spatial streams to the at least one cooperation STA associated with the first AP and the at least one cooperation STA associated with the second AP.

The sending unit 1903 is further configured to return cooperation acknowledgement information to the second AP, where the cooperation acknowledgement information includes at least basic cooperation information of the first AP.

The basic cooperation information of the first AP includes AID of a cooperation STA associated with the first AP, the quantity of spatial streams allocated by the first AP to the at least one cooperation STA associated with the first AP, and a transmission time length.

Optionally, in another embodiment of the present application, the triggering unit 1902 is further configured to send a first trigger frame to the at least one cooperation STA associated with the first AP, where the first trigger frame is used to trigger the at least one cooperation STA associated with the first AP to perform uplink data transmission using a specified quantity of spatial streams and the transmission time length after a specified delay, and the first trigger frame includes the AID of the cooperation STA associated with the first AP, the quantity of spatial streams, the transmission time length, and a delay uplink transmission indicator.

There is an SIFS time between the first trigger frame sent by the first AP and a second trigger frame sent by the second AP, the second trigger frame is used to trigger the at least one cooperation STA associated with the second AP to perform uplink data transmission using a specified quantity of spatial streams and a transmission time length, and the transmission time length of the at least one cooperation STA associated with the first AP is the same as that of the at least one cooperation STA associated with the second AP.

Optionally, the triggering unit 1902 may be further configured to send a third trigger frame to the at least one cooperation STA associated with the first AP and the at least one cooperation STA associated with the second AP, where the third trigger frame is used to trigger the at least one cooperation STA associated with the first AP and the at least one cooperation STA associated with the second AP to perform uplink data transmission in parallel using a corresponding specified quantity of spatial streams.

The third trigger frame includes an AID of the at least one cooperation STA associated with the first AP, a quantity of available spatial streams of the at least one cooperation STA associated with the first AP, and an AID of the at least one cooperation STA associated with the second AP, and a quantity of available spatial streams of the at least one cooperation STA associated with the second AP.

Optionally, in another embodiment, the triggering unit 1902 is further configured to trigger the second AP to simultaneously send a fourth trigger frame to the at least one cooperation STA associated with the first AP and the at least one cooperation STA associated with the second AP, where the fourth trigger frame is used to trigger the at least one cooperation STA associated with the first AP and the at least one cooperation STA associated with the second AP to perform uplink data transmission in parallel using a corresponding specified quantity of spatial streams.

The fourth trigger frame includes an AID of the at least one cooperation STA associated with the first AP, a quantity of available spatial streams of the at least one cooperation STA associated with the first AP, an AID of the at least one cooperation STA associated with the second AP, and a quantity of available spatial streams of the at least one cooperation STA associated with the second AP.

A MAC address of the fourth trigger frame is a MAC address of either of the first AP and the second AP, or is a common MAC address of the first AP and the second AP.

Optionally, in another embodiment of the present application, the apparatus 1900 further includes a receiving unit 1904 configured to receive and parse uplink data sent by the at least one cooperation STA associated with the first AP, and the sending unit 1903 is further configured to return, simultaneously with the second AP in an HE MU PPDU frame format, acknowledgement information to the at least one cooperation STA associated with the first AP and the at least one cooperation STA associated with the second AP, where a preamble of an HE MU PPDU sent by the first AP and a preamble of an HE MU PPDU sent by the second AP have same fields different from HE-STF and HE-LTFs, and a BSS color in the HE MU PPDU sent by the first AP is the same as a BSS color in the HE MU PPDU sent by the second AP, or the sending unit 1903 is further configured to return, simultaneously with the second AP, acknowledgement information in series in a time division manner to at least one cooperation STA associated with the APs.

Optionally, in another embodiment of the present application, the receiving unit 1904 is further configured to receive and parse uplink data sent by the at least one cooperation STA associated with the first AP and the at least one cooperation STA associated with the second AP.

The sending unit 1903 is further configured to return the acknowledgement information to the at least one cooperation STA associated with the first AP and the at least one cooperation STA associated with the second AP.

The sending unit 1903 is further configured to forward the uplink data of the at least one cooperation STA associated with the second AP to the second AP.

Optionally, the sending unit 1903 is further configured to separately send, simultaneously with the second AP in an HE MU PPDU frame format using a specified quantity of transmit streams, downlink data to the at least one cooperation STA associated with the first AP and the at least one cooperation STA associated with the second AP.

A preamble of an HE MU PPDU sent by the first AP is the same as a preamble of an HE MU PPDU sent by the second AP, a quantity of HE-LTFs in the preambles is a total quantity of spatial streams allocated by the first AP and the second AP, and sequences used by all the HE-LTFs are mutually orthogonal.

Optionally, in another embodiment of the present application, the receiving unit 1904 is further configured to receive first acknowledgement information returned by the at least one cooperation STA associated with the first AP, and the second AP receives second acknowledgement information returned by the at least one cooperation STA associated with the second AP.

The first acknowledgement information and the second acknowledgement information are sent in series by the at least one cooperation STA associated with the first AP and the at least one cooperation STA associated with the second AP, or the first acknowledgement information and the second acknowledgement information are sent in parallel in an HE TB PPDU format by the at least one cooperation STA associated with the first AP and the at least one cooperation STA associated with the second AP.

Optionally, the receiving unit 1904 is further configured to receive first acknowledgement information returned by the at least one cooperation STA associated with the first AP, and further receive second acknowledgement information returned by the at least one cooperation STA associated with the second AP.

The sending unit 1903 is further configured to forward the second acknowledgement information of the at least one cooperation STA associated with the second AP to the second AP.

For a working principle of the foregoing data transmission apparatus 1900, refer to FIG. 2 to FIG. 17 and corresponding method descriptions. Details are not described herein again.

Figure 20:
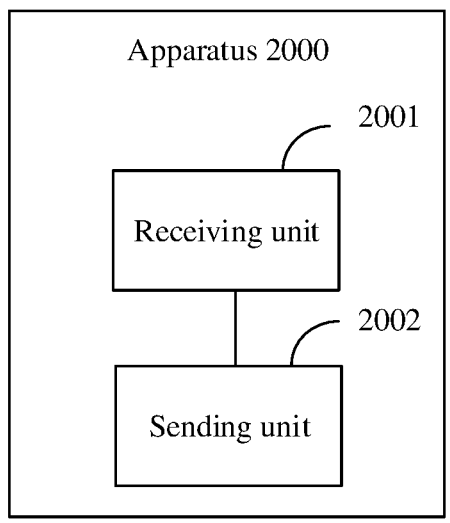
FIG. 20 is a schematic structural diagram of an apparatus according to an embodiment of the present application.

Referring to FIG. 20, an embodiment of the present application provides an apparatus 2000 for data transmission. The apparatus 2000 includes a sending unit 2002 configured to perform, based on a quantity of spatial streams allocated by the first AP, uplink data transmission in parallel with at least one cooperation STA associated with a second AP, where a sum of the quantity of spatial streams allocated by the first AP to at least one cooperation STA associated with the first AP and a quantity of spatial streams allocated by the second AP to the at least one cooperation STA associated with the second AP does not exceed a smaller value of an upper limit of a quantity of received spatial streams of the first AP and an upper limit of a quantity of received spatial streams of the second AP, or a receiving unit 2001 configured to receive, based on the quantity of spatial streams allocated by the first AP, downlink data sent by the first AP, where a sum of the quantity of spatial streams allocated by the first AP to the at least one cooperation STA associated with the first AP and a quantity of spatial streams allocated by the second AP to the at least one cooperation STA associated with the second AP does not exceed a smallest value of upper limits of quantities of received spatial streams of all cooperation STAs associated with the first AP and the second AP.

Optionally, in another embodiment of the present application, the receiving unit 2001 is further configured to receive a first trigger frame sent by the first AP, where the first trigger frame is used to trigger the at least one cooperation STA associated with the first AP to perform uplink data transmission using a specified quantity of spatial streams after a specified delay.

The sending unit 2002 is further configured to perform, based on a delay upload indication of the first trigger frame, uplink data transmission in parallel with the at least one cooperation STA associated with the second AP after receiving a second trigger frame sent by the second AP and there is an SIFS time between the first trigger frame sent by the first AP and a second trigger frame sent by the second AP, the second trigger frame is used to trigger the at least one cooperation STA associated with the second AP to perform uplink data transmission using a specified quantity of spatial streams, and the transmission time length of the at least one cooperation STA associated with the first AP is the same as that of the at least one cooperation STA associated with the second AP.

Optionally, in another embodiment of the present application, the receiving unit 2001 is further configured to receive, together with a cooperation STA associated with the second AP, a third trigger frame sent by the first AP, where the third trigger frame is used to trigger the at least one cooperation STA associated with the first AP and the at least one cooperation STA associated with the second AP to perform uplink data transmission in parallel using each corresponding specified quantity of spatial streams.

The sending unit 2002 is further configured to perform, together with a cooperation STA associated with the second AP, uplink data transmission in parallel based on a quantity of spatial streams that are correspondingly allocated in the third trigger frame, and the third trigger frame includes an AID of the at least one cooperation STA associated with the first AP, a quantity of available spatial streams of the at least one cooperation STA associated with the first AP, and an AID of the at least one cooperation STA associated with the second AP, and a quantity of available spatial streams of the at least one cooperation STA associated with the second AP.

Optionally, in another embodiment of the present application, the receiving unit 2001 is further configured to receive, together with a cooperation STA associated with the second AP, a fourth trigger frame sent by the first AP and a fourth trigger frame sent by the second AP, where the third trigger frame is used to trigger the at least one cooperation STA associated with the first AP and the at least one cooperation STA associated with the second AP to perform uplink data transmission in parallel using each corresponding specified quantity of spatial streams.

The sending unit 2002 is further configured to perform, together with the cooperation STA associated with the second AP, uplink data transmission in parallel based on a quantity of spatial streams that are correspondingly allocated in the fourth trigger frame, and a MAC address of the fourth trigger frame is a MAC address of either of the first AP and the second AP, or is a common MAC address of the first AP and the second AP.

Further, optionally, the sending unit 2002 is further configured to sequentially and serially return first acknowledgement information and second acknowledgement information together with the at least one cooperation STA associated with the second AP, or the sending unit 2002 is further configured to return the first acknowledgement information and the second acknowledgement information in parallel together with the at least one cooperation STA associated with the second AP using a frame format of an HE TB PPDU.

For a working principle of the foregoing data transmission apparatus 2000, refer to FIG. 2, FIG. 8 to FIG. 17 and corresponding method descriptions. Details are not described herein again.

Figure 21:
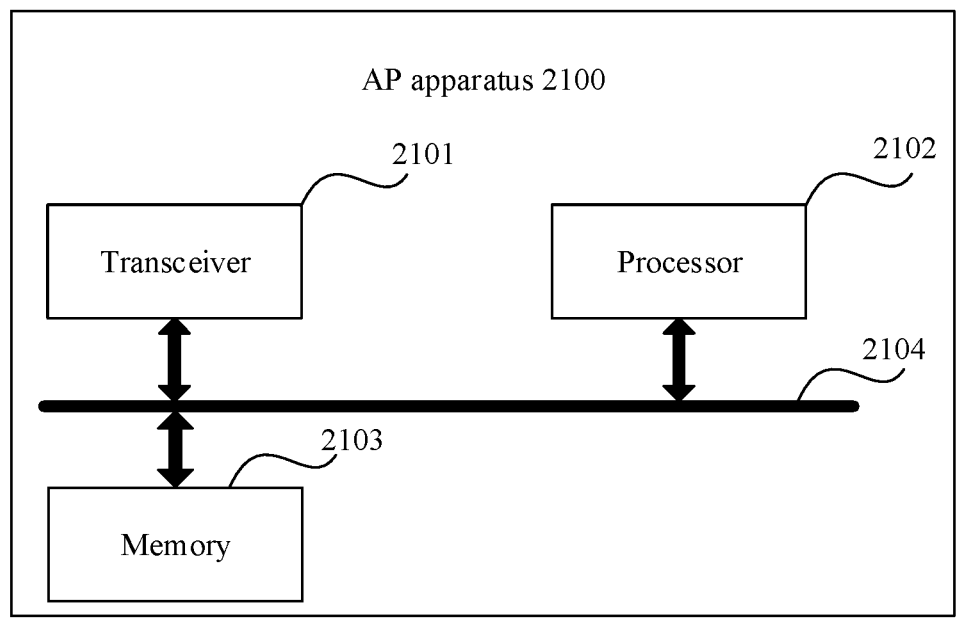
FIG. 21 is a schematic structural diagram of an AP apparatus according to an embodiment of the present application.

FIG. 21 shows an AP apparatus 2100 according to an embodiment of the present application.

The apparatus 2100 includes a transceiver 2101, a processor 2102, and a memory 2103. The transceiver 2101, the processor 2102, and the memory 2103 are interconnected. A specific medium for connecting the foregoing parts is not limited in this embodiment of the present application. In this embodiment of the present application, in FIG. 21, the memory 2103, the processor 2102, and the transceiver 2101 are connected using a bus 2104, and the bus 2104 is represented by a bold line in FIG. 21. A connection manner between other parts is merely an example for description, and does not impose a limitation. Based on constraints on specific application and overall design of the AP apparatus 2100, the bus 2104 may include any quantity of interconnected buses and bridges. The bus 2104 may be classified into an address bus, a data bus, a control bus, and the like. For ease of representation, only one thick line is used to represent the bus 2104 in FIG. 21, but this does not mean that there is only one bus or only one type of bus.

The memory 2103 may include a read-only memory (ROM) and a random access memory (RAM), and provide an instruction and data to the processor 2102. A part of the memory 2103 may further include a non-volatile RAM (NVRAM). For example, the memory 2103 may further store information about an apparatus type. The processor 2102 may be configured to execute the instruction stored in the memory 2103, and when the processor 2102 executes the instruction, the processor 2102 may perform steps in the foregoing method embodiments in FIG. 2 to FIG. 15 and method descriptions corresponding to the method embodiments.

Figure 22:
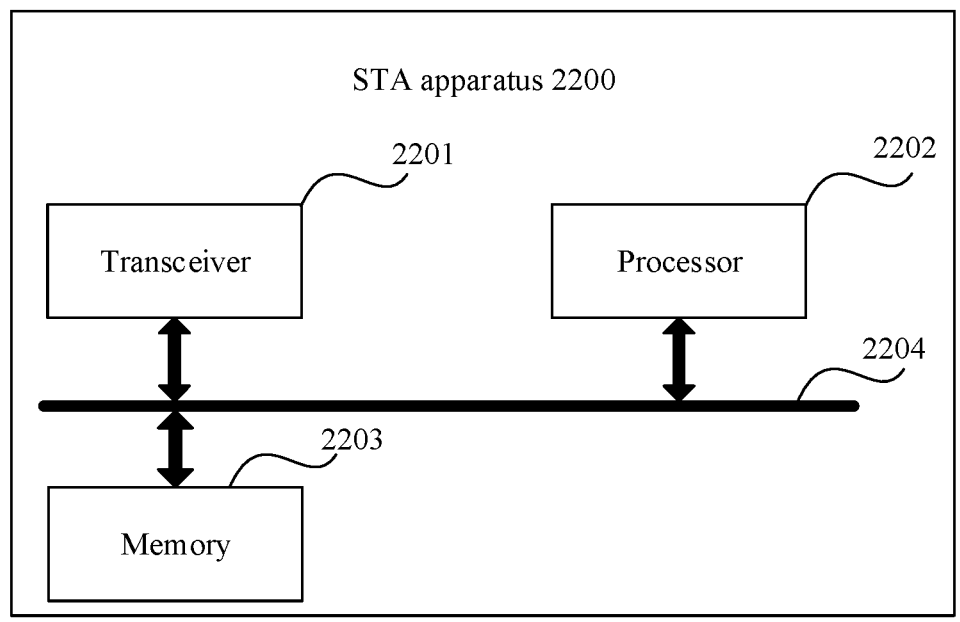
FIG. 22 is a schematic structural diagram of a STA apparatus according to an embodiment of the present application.

FIG. 22 shows a STA apparatus 2200 according to an embodiment of the present application.

The STA apparatus 2200 includes a transceiver 2201, a processor 2202, and a memory 2203. The transceiver 2201, the processor 2202, and the memory 2203 are interconnected. A specific medium for connecting the foregoing parts is not limited in this embodiment of the present application. In this embodiment of the present application, in FIG. 22, the memory 2203, the processor 2202, and the transceiver 2201 are connected using a bus 2204, and the bus 2204 is represented by a bold line in FIG. 22. A connection manner between other parts is merely an example for description, and does not impose a limitation. Based on constraints on specific application and overall design of the STA apparatus 2200, the bus 2204 may include any quantity of interconnected buses and bridges. The bus 2204 may be classified into an address bus, a data bus, a control bus, and the like. For ease of representation, only one thick line is used to represent the bus 2204 in FIG. 22, but this does not mean that there is only one bus or only one type of bus.

Optionally, the memory 2203 includes a ROM and a RAM, and provides an instruction and data to the processor 2202. A part of the memory 2203 may further include an NVRAM. For example, the memory 2203 may further store information about an apparatus type, but is not limited herein. The processor 2202 may be configured to execute the instruction stored in the memory 2203, and the processor 2202 may perform steps corresponding to the apparatus in the foregoing method embodiment.

It should be noted that a person skilled in the art may understand that division of modules in the embodiments is an example, and is merely logical function division. There may be another division manner in actual implementation. In addition, functional modules in the embodiments of this application may be integrated into one processing module, or each module may exist alone physically, or two or more modules are integrated into one module. The integrated module may be implemented in a form of hardware, or may be implemented in a form of a software functional module. In addition, there may be a plurality of specific naming manners of concepts and apparatus function modules in the foregoing embodiments. For example, in addition to being referred to as an AP, the AP may also be referred to as a base STA, a router, a gateway, a repeater, or a bridge. In addition to being referred to as a STA, the STA may also be referred to as a terminal, a user apparatus, or the like. This is not limited in the present application.

A person skilled in the art should understand that the embodiments of the present application may be provided as a method, a system, or a computer program product. Therefore, the present application may use a form of hardware only embodiments, software only embodiments, or embodiments with a combination of software and hardware. In addition, a computer readable storage medium may be further used in the present application, and the computer readable storage medium stores an instruction. When the instruction is run on a computer, the computer is enabled to perform the method in the foregoing aspects. According to still another aspect, an embodiment of the present application provides a computer program product including an instruction. When the computer program product is run on a computer, the computer is enabled to perform the method in the foregoing aspects.

The foregoing descriptions are merely optional embodiments of the present application, but are not intended to limit the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data transmission method implemented by a first access point (AP), comprising:
generating a first trigger frame; and
sending the first trigger frame to a first cooperation station (STA) associated with the first AP,
wherein the first trigger frame comprises a first association identifier (AID) of the first cooperation STA, a first quantity of spatial streams, and a first transmission time length, wherein the first trigger frame triggers the first cooperation STA to perform first uplink data transmission, wherein there is a short interframe space (SIFS) time between when the first AP sends the first trigger frame and when a second AP sends a second trigger frame, and wherein the first transmission time length is the same as a second transmission time length of a second cooperation STA associated with the second AP.

2. The data transmission method of claim 1, wherein the first trigger frame further comprises a delay uplink transmission indicator, and wherein the delay uplink transmission indicator instructs the first cooperation STA to perform the first uplink data transmission using the first quantity of spatial streams and the first transmission time length after a first delay.

3. The data transmission method of claim 2, wherein the delay uplink transmission indicator is a reserve bit in a common information field of the first trigger frame.

4. The data transmission method of claim 1, wherein a sum of the first quantity of spatial streams and a second quantity of spatial streams allocated by the second AP to the second cooperation STA does not exceed a minimum value of upper limits of quantities of received spatial streams of all cooperation STAs associated with the first AP and the second AP.

5. The data transmission method of claim 1, wherein before sending the first trigger frame to the first cooperation STA, the data transmission method further comprises receiving cooperation configuration information from the second AP, and wherein the cooperation configuration information comprises a second AID of the second cooperation STA, a quantity of cooperation STAs associated with the second AP, a modulation and coding scheme, and the second transmission time length.

6. The data transmission method of claim 1, further comprising:
   receiving, by the first AP, uplink data after the first cooperation STA performs the first uplink d a transmission, and
   returning, by the first AP in response to receiving the uplink data, acknowledgement information to the first cooperation STA, wherein the first AP returns the acknowledgement information via a high-efficiency (HE) mufti-use (MU) physical layer convergence procedure (PLCP) protocol data unit (PPDU) frame format, and wherein the acknowledgement information includes a third transmission time length of downlink data to be sent from the first AP to the first cooperation STA.

7. A data transmission apparatus applied in a first access point (AP), comprising:
   a processor; and
   a memory coupled to the processor and configured to store instructions that, when executed by the processor, cause the data transmission apparatus to:
      generate a first trigger frame; and
      send the first trigger frame to a first cooperation station (STA) associated with the first AP,
   wherein the first trigger frame comprises a first association identifier (AID) of the first cooperation STA, a first quantity of spatial streams, and a first transmission time length, wherein the first trigger frame triggers the first cooperation STA to perform a first uplink data transmission, wherein there is a short interframe space (SIFS) time between a first time when the first AP sends the first trigger frame and a second time when a second AP sends a second trigger frame to a second cooperation STA associated with the second AP, and wherein the first transmission time length is the same as a second transmission time length specified by the second trigger frame from the second AP to the second cooperation STA associated with the second AP.

8. The data transmission apparatus of claim 7, wherein the first trigger frame further comprises a delay uplink transmission indicator, and wherein the delay uplink transmission indicator instructs the first cooperation STA to perform the first uplink data transmission after a first delay.

9. The data transmission apparatus of claim 8, wherein the delay uplink transmission indicator is a reserve bit in a common information field of the first trigger frame.

10. The data transmission apparatus of claim 7, wherein a sum of the first quantity of spatial streams and a second quantity of spatial streams allocated by the second AP to the second cooperation STA does not exceed a minimum value of upper limits of quantities of received spatial streams of all cooperation STAs associated with the first AP and the second AP.

11. The data transmission apparatus of claim 7, wherein the instructions that, when executed by the processor, further cause the data transmission apparatus to receive, cooperation configuration information from the second AP, and wherein the cooperation configuration information comprises at least one of a second AID of the second cooperation STA or a second quantity of spatial streams of the second cooperation STA.

12. The data transmission apparatus of claim 11, wherein the cooperation configuration information further comprises a quantity of cooperation STAs associated with the second AP, a modulation and coding scheme, and the second transmission time length, and wherein the data transmission apparatus is further configured to perform, based on the cooperation configuration information, a first downlink data transmission simultaneously with a second downlink data transmission performed by the second AP.

13. A first cooperation station (STA), comprising:
   a processor; and
   a memory coupled to the processor and configured to store instructions that, when executed by the processor, cause the first cooperation STA to:
      receive a first trigger frame from a first access point (AP) associated with the first cooperation STA, wherein the first trigger frame comprises a first association identifier (AID) of the first cooperation STA, a first quantity of spatial streams, and a first transmission time length, wherein the first trigger frame instructs to trigger the first cooperation STA to perform a first uplink data transmission, wherein there is a short interframe space (SIFS) time delay between when the first AP sends the first trigger frame and when a second AP sends a second trigger frame to a second cooperation STA associated with the second AP, and wherein the first transmission time length is the same as a second transmission time length specified by the second trigger frame; and
      perform the first uplink data transmission based on the first trigger frame.

14. The first cooperation STA of claim 13, wherein the first trigger frame further comprises a delay uplink transmission indicator, wherein the delay uplink transmission indicator instructs the first cooperation STA to perform the first uplink data transmission after a first delay, and wherein the instructions that, when executed by the processor, further cause the first cooperation STA to perform, after the first delay, the first uplink data transmission in parallel with a second up ink data transmission performed by the second cooperation STA.

15. The first cooperation STA of claim 14, wherein the delay uplink transmission indicator is a reserve bit in a common information field of the first trigger frame.

16. The first cooperation STA of claim 14, wherein the delay uplink transmission indicator is a reserve bit in a user info field of the first trigger frame.

17. The data transmission method of claim 2, wherein the delay uplink transmission indicator is a reserve bit in a user info field of the first trigger frame.

18. The data transmission method of claim 1, wherein before sending the first trigger frame to the first cooperation STA, the data transmission method further comprises receiving cooperation configuration information from the second AP, and wherein the cooperation configuration information comprises a second quantity of spatial streams of the second cooperation STA for a second uplink data transmission, a quantity of cooperation STAs associated with the second AP, a modulation and coding scheme, and a physical layer convergence procedure (PLCP) protocol data unit (PPDU) transmission time length such that the first AP and second APs separately trigger the first and second cooperation STAs to perform the first and second uplink data transmissions in parallel.

19. The data transmission method of claim 1, wherein before sending the first trigger frame to the first cooperation STA, the data transmission method further comprises receiving cooperation configuration information from the second AP, and wherein the cooperation configuration information comprises a second AID of the second cooperation STA, a second quantity of spatial streams of the second cooperation STA, a quantity of cooperation STAs associated with the second AP, a modulation and coding scheme, and the second transmission time length.

20. The data transmission apparatus of claim 8, wherein the delay uplink transmission indicator is a reserve bit in a user info field of the first trigger frame.

* * * * *

UNITED STATES PATENT AND TRADEMARK OFFICE
CERTIFICATE OF CORRECTION

PATENT NO. : 11,412,516 B2
APPLICATION NO. : 16/791726
DATED : August 9, 2022
INVENTOR(S) : Yunbo Li, Ming Gan and Tao Wu Page 1 of 1

It is certified that error appears in the above-identified patent and that said Letters Patent is hereby corrected as shown below:

In the Claims

Claim 6, Column 29, Line 16: "uplink d a" should read "uplink data"

Claim 14, Column 30, Line 46: "second up ink data" should read "second uplink data"

Signed and Sealed this
Fourth Day of October, 2022

Katherine Kelly Vidal
*Director of the United States Patent and Trademark Office*